US012198508B2

(12) United States Patent
Lombardo

(10) Patent No.: US 12,198,508 B2
(45) Date of Patent: Jan. 14, 2025

(54) RANDOMLY MODULATED BOOSTED FEATURE AREAS FOR SLOT MACHINE

(71) Applicant: AGS LLC, Las Vegas, NV (US)

(72) Inventor: Paul Luke Lombardo, Macquarie Park (AU)

(73) Assignee: AGS LLC, Las Vegas, NV (US)

( * ) Notice: Subject to any disclaimer, the term of this patent is extended or adjusted under 35 U.S.C. 154(b) by 219 days.

(21) Appl. No.: 17/846,225

(22) Filed: Jun. 22, 2022

(65) Prior Publication Data

US 2022/0319282 A1 Oct. 6, 2022

Related U.S. Application Data

(62) Division of application No. 16/583,831, filed on Sep. 26, 2019, now Pat. No. 11,373,486.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC .......... *G07F 17/34* (2013.01); *G07F 17/3213* (2013.01); *G07F 17/3267* (2013.01)

(58) Field of Classification Search

CPC .. G07F 17/34; G07F 17/3244; G07F 17/3267; G07F 17/3213

See application file for complete search history.

(56) References Cited

U.S. PATENT DOCUMENTS

| | | | | |
|---|---|---|---|---|
| 7,704,141 | B1 | 4/2010 | Marks et al. | |
| 7,758,414 | B1 | 7/2010 | Marks et al. | |
| 8,834,258 | B2 | 9/2014 | Gobe et al. | |
| 9,153,102 | B2 | 10/2015 | Meyer | |
| 9,728,034 | B2 | 8/2017 | Vancura | |
| 2008/0188286 | A1 | 8/2008 | Jaffe | |
| 2009/0227341 | A1 | 9/2009 | Curtin | |
| 2009/0233684 | A1 | 9/2009 | Shai-Hee | |
| 2010/0029360 | A1 | 2/2010 | Roukis | |
| 2010/0178974 | A1 | 7/2010 | Nguyen | |
| 2011/0207533 | A1 | 8/2011 | Lind et al. | |
| 2015/0170477 | A1 | 6/2015 | Souza et al. | |
| 2015/0254932 | A1* | 9/2015 | Boese | G07F 17/3218 463/20 |
| 2016/0328926 | A1* | 11/2016 | Boese | G07F 17/3213 |
| 2019/0005770 | A1 | 1/2019 | MacGregor | |
| 2019/0147691 | A1 | 5/2019 | Grace | |
| 2019/0213838 | A1 | 7/2019 | Hemovich | |

OTHER PUBLICATIONS

Konami Gaming, Inc., Star Watch Magma | Official Slot Game Video | Konami Gaming, Inc., https://www.youtube.com/watch?v=wX_DbNUqbuM.

* cited by examiner

*Primary Examiner* — David L Lewis
*Assistant Examiner* — Eric M Thomas
(74) *Attorney, Agent, or Firm* — WEIDE & MILLER, LTD.

(57) ABSTRACT

A gaming machine produces boosted feature areas of different sizes and/or shapes and/or locations based on chance and alerts players and bystanders of such changes when they happen.

19 Claims, 16 Drawing Sheets

RANDOMLY MODULATED BOOSTED FEATURE AREAS FOR SLOT MACHINE

RELATED APPLICATION DATA

This application is a divisional of U.S. patent application Ser. No. 16/583,831, filed Sep. 26, 2019. The present application claims priority to said application and incorporates by reference each of said application as if set forth fully herein.

FIELD OF THE INVENTION

The present disclosure relates to operations of a gaming machine within a gaming environment.

BACKGROUND OF THE INVENTION

Slot-type electronic and/or mechanical gaming machines, often also referred as slot machines, are popular fixtures in casino or other gaming environments. Such slot machines are generally controlled by installed software programs. Aside from slot machines, various other kinds of gaming devices, including electronically-assisted gaming tables are also generally controlled by installed software programs. Generally, the installed software programs are stored in secured memory devices housed in secured cabinets and executed by secured processors and/or other programmable hardware also housed in the secured cabinets. The displayed outcome of each round of gaming action (e.g., spinning and settling of on-screen virtual reels) often remains relatively static. After prolonged play, gamers may become bored by monotonous display of the same basic game template (e.g., three displayed rows of five vertical reels and one horizontal payline) over and over again.

It is not only the gamers who directly interface with the gaming machine who may become bored. Various types of further people can surround each gaming machine. Participants in a gaming environment may include not only the one or more primary players who are directly using the slot or other software driven gaming apparatuses in front of them by engaging with external user inputs (e.g., buttons, touch screens). They may include one or more locally adjacent players who are similarly directly using locally adjacent slot or other software driven gaming apparatuses but can see the gaming action on the machines next to them. The participants may also include adjacent bystanders (e.g., players' friends) who are standing nearby (e.g., over the shoulder of) the primary players and nearby passers-by who happen to be passing by in an area where they can view part of the gaming action(s) of one or more of the slot or other software driven gaming apparatuses including displays of so-called, attractor advertisements.

One prior art solution to avoiding boredom occasionally activates a boosted features zone among the horizontal rows and columns of the on-screen reels. More specifically, the Ainsworth Rumble Rumble™ slot game provides a boosted features zone of fixed size and shape. The boosted features zone appears as overlaid to cover predefined parts of the displayed rows and columns of the on-screen reels. When a special-feature symbol such as a WILD card symbol lands by chance inside the fixed-size/shape zone, normal aspects or features of such a special-feature symbol are "boosted" to thereby allow for winnings above and beyond normal winnings expected for such special-feature symbols. For example, a normal Wild card symbol may enable a winning substitution (e.g., completion of a winning cards hand) only for the one position it lands on. On the other hand, if the same Wild card symbol appears inside the fixed-size/shape boosted features zone, that special-feature symbol may spawn additional features (boosted features) such as replicating itself into more positions on the displayed array of vertical reels and horizontal symbol rows. This boosts the chances that the player will win something from the given spin. When free spins are awarded by the Ainsworth Rumble Rumble™ slot game, the displayed array of vertical reels and horizontal symbol rows grows in size, thus allowing for an even greater extent of boosting. However, the boosted features zone remains of fixed in size and shape.

Another prior art solution is found in the Konami Celestial Moon Riches™ slot game. It also provides a boosted features zone (also referred to as a "strike zone"). Size and shape of the boosted features zone is predetermined and depends on the amount the player wagers prior to each gaming action (e.g., each pull of the spin activating lever). The more the player bets, the greater the size of the boosted features zone. The predetermined size and shape may be defined by a lookup table (LUT) that has amount of wager as its input.

It is desirable to add further entertainment and excitement for players in games where a boosted features zone appears.

It is to be understood that some concepts and ideas provided in this description of the Background may be novel rather than part of the prior art.

SUMMARY OF THE INVENTION

Various embodiments in accordance with the present disclosure generally relate to generating boosted feature areas of different sizes and/or shapes and/or locations based on chance and alerting players and bystanders of such changes when they happen.

In one embodiment, a machine-implemented method is carried out for a slot machine where the method comprises: (a) detecting initiation of a current gaming action on the slot machine; (b) responsive to the detection of initiation of the current gaming action, determining by chance at least one of a size, shape and location of a boosted features area to be used for the initiated current gaming action; (c) determining if a special-feature symbol is landing inside the determined boosted features area of the current gaming action; and (d) applying a corresponding boosting for the special-feature symbol that is determined to be landing inside the determined boosted features area of the current gaming action. In one embodiment, the machine-implemented method further comprises: (e) determining if the determined boosted features area of the current gaming action is different from a boosted features area used in a gaming action immediately prior to the current gaming action; and (f) responsive to determining that determined boosted features area of the current gaming action is different, generating at least one of display, sound and haptic effects that draw attention to the difference.

Other aspects of the present disclosure will become apparent from the below detailed descriptions.

DESCRIPTION OF THE DRAWINGS

The present disclosure may be better understood by reference to the following detailed description taken in conjunction with the accompanying drawings, which illustrate particular embodiments in accordance with the present disclosure.

DETAILED DESCRIPTION OF THE INVENTION

Figure 1A:
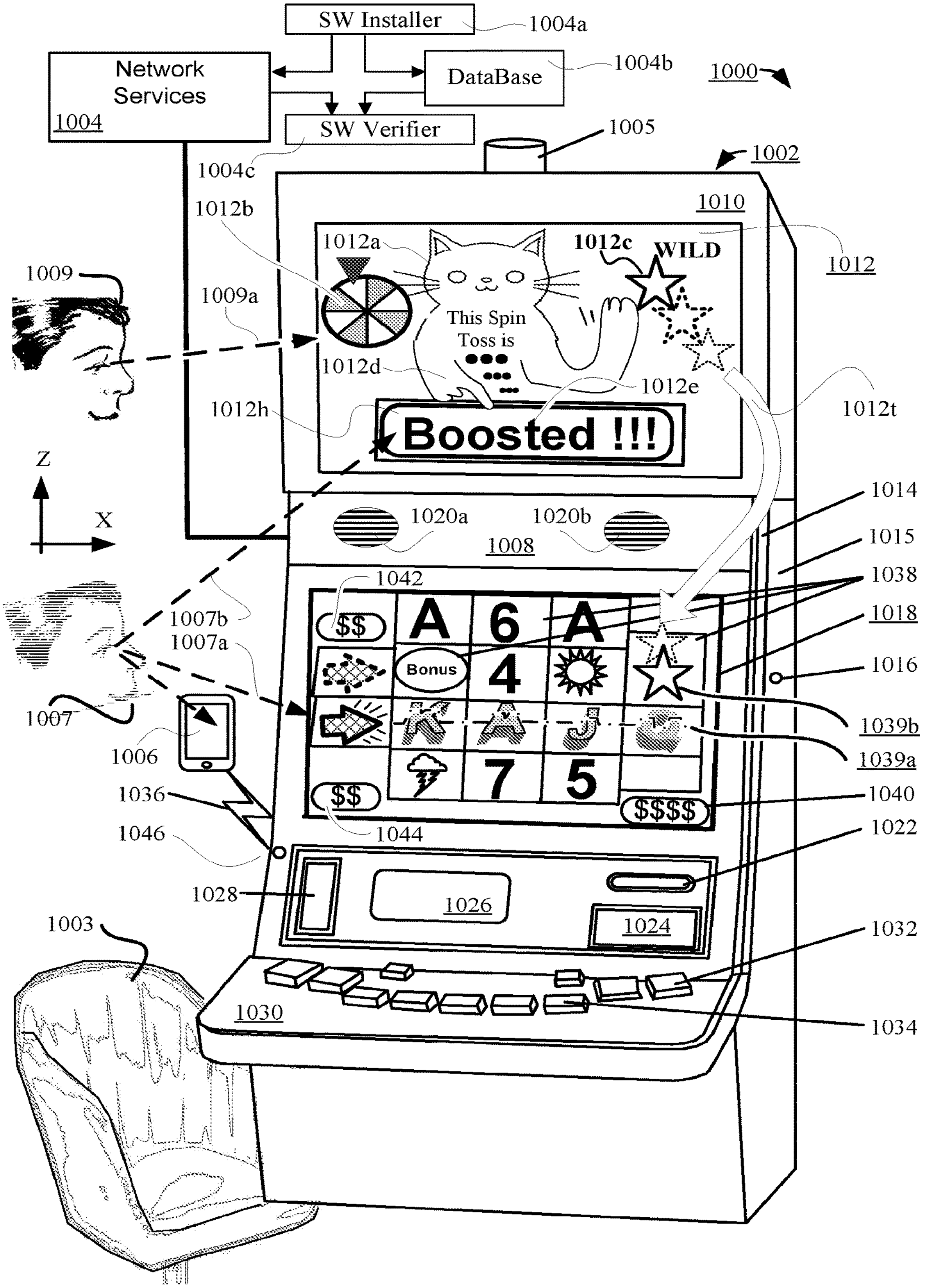
FIG. 1A illustrates a gaming system and environment including a wager-based gaming machine in accordance with the present disclosure.

Reference will now be made in detail to some specific embodiments in accordance with the present disclosure. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1A and 2, a gaming machine system including a plurality of automated wager-based gaming machines in communication with network devices is described. The gaming machine system can support wager-based games where a progressively growing prize or award is made possible and/or where the unleashing of a whole series of bonuses or other awards is made possible. Although not indicated in FIGS. 1A, 2, one of the mandates of operating a secure gaming system is that direct remote reconfiguration of the gaming machines (EGM's e.g., 1002) and their associated in-casino network controllers (e.g., 1004) is not permitted at least for certain classes of wager-based games (e.g., Class III games) and/or in certain jurisdictions or certain gaming organizations. Reconfiguration often requires that an authorized human being (e.g., 1065 of FIG. 2) open a secured housing (e.g., with an allocated mechanical key) and perform the reconfiguration (with aid of an electronic security key and entry of appropriate passwords) while in plain sight on the casino floor so that such activities can be monitored and audited by casino security teams.

FIG. 1A illustrates part of an automated gaming system 1000 in accordance with the disclosure that includes a wager-based gaming machine 1002 (e.g., a slot machine). The wager-based gaming machine 1002 can include wireless or wired communication interfaces which allow communications with remote servers and/or other devices including a remote services providing network 1004 (e.g., having service providing servers and/or other data storing, communicating and data processing units—not explicitly shown). The services providing network 1004 can provide privacy/integrity-secured services such as but not limited to player tracking and progressive gaming. (Some specific network services are described in more detail in conjunction with FIG. 2). The player tracking service can be part of a slot accounting system that for example keeps track of each player's winnings and expenditures (including, in some embodiments, player contributions to one or more progressive jackpot pools). In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators or authorized gaming inspectors. A mobile device carried by a primary player (e.g., 1007) can be configured to perform secured gaming-related functions, such as functions associated with transferring funds to or from the specific gaming machine 1002 and the primary player's account(s) or functions related to player tracking. A mobile device carried by a casino operator can be configured to perform secured operator-related functions, such as performing hand pays, responding to tilt conditions or collecting metering related information. A mobile device carried by an authorized gaming inspector (not shown) can be configured to perform inspection related functions, such as actuating software verification procedures.

Use of mobile devices is not limited to secured transactions. In one embodiment, mobile devices may be used for social networking. For example, a primary player 1007 may authorize his/her mobile device (e.g., 1006) to automatically interact with a currently used gaming machine 1002 for the purpose of automatically posting to a user-chosen social network various announcements such as, but not limited to, that the primary player 1007 has been having fun playing the Lucky Kitty Boosted Features game (a fictitious name for purposes herein) for X hours at the given gaming establishment or that the Lucky Kitty Boosted Features game has just awarded the primary player 1007 a symbols upgrade that now gives that player an opportunity to spin for a jackpot and/or other awards. The primary player 1007 may alternatively or additionally authorize his/her mobile device (e.g., 1006) to automatically announce (wirelessly) to a selected group of friends or associates that player 1007 has just been awarded an opportunity to spin for a jackpot and/or other awards and inviting them to stop by and watch the fun (e.g., as nearby other person 1009 is doing over the shoulder of the primary player 1007, where the latter in one embodiment, is seated in chair 1003 situated in front of gaming machine 1002.)

According to the same or an alternate embodiment, the primary player 1007 may use his/her mobile device (e.g., 1006) to temporarily reserve the particular gaming machine 1002 for a predetermined amount of time (e.g., no more than say 10 to 30 minutes) so that the primary player may temporarily step away to attend to various needs. While the primary player 1007 is temporarily away, the gaming machine 1002 may display a reservation notice saying for example, "This machine is reserved for the next MINI minutes by a winning player who, thanks to Boosted Features action, was recently awarded a lucky opportunity to spin for a jackpot and/or other awards. Stand by and watch for more such lucky opportunities!" (where here MINI is a progressively decreasing time counter). The reservation notice may be prominently posted on an upper display 1012 of the gaming machine 1002 as shall next be described.

The gaming machine 1002 can include a mechanically-lockable base cabinet 1008 and an upper or top box 1010 fixedly mounted above the cabinet. The top box 1010 includes an upper display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the symbols-tossing Lucky Kitty illustrated as an example at 1012*a*). The animated wheels or reels (e.g., virtual wheel 1012*b*) can be configured to spin and to stop to reveal an occasional opportunity to spin for a jackpot and/or other awards and/or the awarding of a grand prize such as a progressive jackpot (not shown). In one embodiment, unique occurrences that are provided by chance; such as of the boosting of opportunities provided by added-in special-feature symbols (e.g., WILD card symbols such as 1012*c*) may be pointed to by an animated finger 1012*d* of the Lucky Kitty character 1012*a* (or other appropriate animated figure). In one embodiment, a free other hand of the character may wave or otherwise gesture to attract attention to a current possibility of throwing in more special feature symbols (e.g., WILD cards) for an upcoming spin and/or to advertise the possibility of other awards and/or the actual awarding of a relatively large prizes such as a progressive jackpot (not shown). The Lucky Kitty character 1012*a* (or other appropriate animated figure) may occasionally show various attention-grabbing items such as an attention getting flag or a virtual fireworks sparkler, etc. (not shown) at the appropriate times, for example when the gaming machine is automatically determined to be in an idle mode. At other times and/or in other examples, the video content of the upper display 1012 can include advertisements and promotions, such as for example, "A jackpot amount of more than $100,000 was awarded on this machine two weeks ago. Is this a lucky machine for you too?"

Figure 1B:
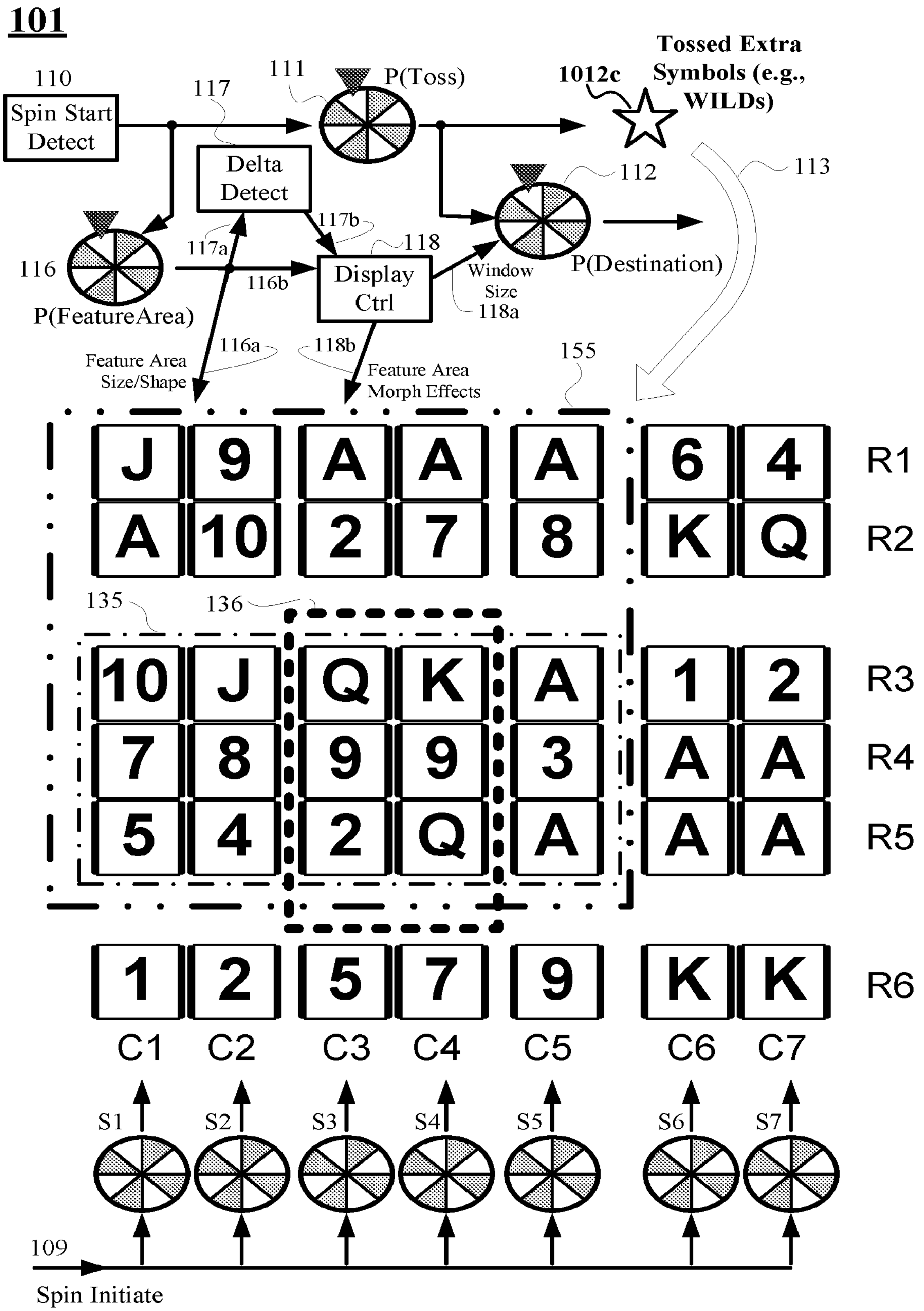
FIG. 1B illustrates a gaming system configured to generate boosted feature areas of different sizes and/or shapes and/or locations based on chance and to alert players and bystanders of such changes when they happen.

It is to be understood that the illustration of an animated character (the Lucky Kitty 1012*a*) "tossing" special-feature symbols (e.g., WILD cards) as insertions or substitutions into the reels area 1038 of FIG. 1B is merely exemplary and provided for purposes of making certain concepts easier to understand. It is within the contemplation of the present disclosure that special-feature symbols can alternatively or additionally, come up in the reels area as reel-borne symbols that are interspersed on the reels similar to the way that normal playing card symbols or other such normal game symbols are provided on the reels and land in the on-screen viewing area by chance. It is also to be understood that the WILD cards (e.g., 1012*c*) are merely examples of special-feature symbols. Those skilled in the art will appreciate that conventional WILD cards can act as substitutes for any of the normal game symbols as appropriate for providing a better dealt hand for the player. However, there are other special-feature symbols (e.g., special kinds of WILDs) that can act as substitutes for only a predetermined subset of the normal game symbols. Depending on each specific kind of game and its respective prespecified rules, special-feature symbols can be established for providing any of a wide variety of above-normal functionalities of the normal game symbols. These above-normal functionalities may be implemented with the presence of just one special-feature symbol alone or may require that the special-feature symbol links up with yet another such special-feature symbol or with a specified normal game symbol before its above-normal functionalities are provided for the benefit of the player. Merely by way of example, aside from the substitutability provided by various kinds of WILD cards, special-feature symbols may benefit the player by providing for bonus free spins, by providing for a chance to double or otherwise multiply the potential award of a current spin, by providing for a chance for the player to spin for some additional awards and so forth.

In accordance with an aspect of the present disclosure, one of the attractions of the gaming machine is that it occasionally and by chance offers boosted features areas of shifting locations and/or enlarged sizes that change and/or increase the chance that a special-feature symbol (e.g., WILD card 1012*c*) will land in a boosted features area (e.g., symbols row 1039*a*) and thus get boosted for providing above normal benefits beyond those normally provided by the landing special-feature symbol (e.g., WILD). The by-chance determined boosted-features area(s) for the current gaming action is/are displayed before corresponding special-feature symbols (e.g., WILD cards) settle into place in that boosted-features area. During the interim between the initiation of the spin and final settling or not of special-feature symbols into the boosted-features area of the current gaming action, players may experience excitement in hoping for special-feature symbols to settle into the boosted-features area of the current gaming action and then have their features boosted accordingly. The eye gaze (e.g., 1007*b*) of primary players (e.g., 1007) and the eye gaze (e.g., 1009*a*) of other persons (e.g., 1009) may be drawn by appropriate display effects (e.g., a flashing BOOSTED sign 1012*e*) to the occurrence of a change of a boosted-features area and/or the occurrence of a boosting action due to a special-feature symbol (e.g., WILD) landing by chance within a by-chance defined, boosted features area.

In accordance with one aspect of the present disclosure, security measures are automatically and repeatedly taken to assure that only approved software programs are installed and run on or for the slot or other software driven gaming apparatuses. Briefly and for sake of introduction, a gaming control program (e.g., one composed of executable code and control data) may be installed into the network services block 1004 by a software driven installer 1004*a* that is brought on-site by an authorized technician. At the time of installation, the installer 1004*a* also stores software verification data into database 1004*b*. Later when the installed gaming control program is called on, but before its execution proceeds, a software driven verifier 1004*c* automatically accesses the stored verification data in the database 1004*b* and uses it to verify that the called upon program is the same as the originally installed program. This can prevent software hackers from maliciously introducing unapproved gaming control code into the network services block 1004 with the aim for example, of causing a jackpot or other such benefits to be awarded to them themselves or to their associates.

Staying still with the detailed description of FIG. 1A, in alternate embodiments, the top box 1010 can include one or more mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large jackpots might be won. The wheel(s) can be spun and stopped at particular stopping points to reveal a bonus award situation or a multi-symbol transformation situation (e.g., awarding multiple wild cards, where the latter can increase the chance for boosting action 1012*e*). In yet other embodiments, the top box 1010 can include a plurality of upper displays that provide similar functions. With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, one of the tasks of a described code/data verifier is to verify that utilized software and control data use pre-approved hardware, firmware and/or software for properly providing random chances of respective predetermined probabilities at winning and or getting a chance to spin for respective prizes including for a progressive jackpot pool. In yet other embodiments, upper display area 1012 can be part of a unitary computer display monitor (e.g., and ultrahigh definition or UHD color monitor) that further includes the below described, lower display area 1018.

It will be appreciated by those familiar with gaming environments that participants in various gaming environments (also briefly see FIG. 2) include respective primary players like 1007 who are directly using their respective slot machines (e.g., 1002) and are each typically seated on a chair (e.g., 1003) disposed in front of the gaming machine so as to thereby position that primary player's eyes substantially level with a central vertical position (along the vertical Z axis) with a primary game outcome display area 1018 of the gaming machine 1002 thus allowing for a comfortable gaze angle indicated by viewing vector 1007*a*. The primary game outcome display area 1018 typically being positioned vertically below and slightly spaced apart from the upper video display area 1012. The vertical elevation of the upper video display area 1012 is chosen so as to be easily viewed by adjacent player(s) who is/are directly using adjacent slot machines (for example at an eye incline angle shown as viewing vector 1007*b*) and also to be easily viewed by adjacent bystanders 1009 (e.g., a player's friends) who are standing nearby the primary player or nearby one of the adjacent players or are nearby passers by who happen to be passing by in an area where they can view part of the gaming action(s) of one or more of the slot machines; and in particular the actions displayed by the upper video display 1012 at a comfortable viewing vector 1009*a*. Due to real or simulated movements of the mechanical reels and/or video reels in the primary game outcome display area 1018 and in the upper video display area 1012, the primary players and the adjacent other persons may experience various emotional responses and derive entertainment value and expectations for further excitement from the unique ways in which the slot game (e.g., the Lucky Kitty Boosted Features game illustrated as an example in areas 1012 and 1018 or other such software driven gaming actions) are progressing. For example, when a low frequency winning hand appears on a wagered-for pay line such as 1039*a*, attention grabbing other symbols (e.g., flashing arrow noted by gaze line 1007*a*) may be automatically presented on the gaming machine. In accordance with one aspect of the present disclosure, before the primary player 1007 spins for the jackpot (e.g., using virtual wheel 1012*b*), attention grabbing further and larger displays appear on the upper video display 1012 (e.g., "Big Win Possible Here!"—not shown) so they are in the line of sight 1009*a* of bystanders or other primary players. This can increase emotional levels of all involved and heightened enjoyment of the gaming actions. In other words, a mixture of emotions may be created of both heightened expectations and foreboding that all the expected rewards may or may not be realized. If the primary player 1007 continues to win low frequency winning hands such as the King, Ace, Jack, Queen poker hand (K,A,J,Q) shown on line 1039*a*, the expectations for jackpot or like big payouts can increase, thus providing increased entertainment and excitement to those nearby the gaming machine 1002 (and optionally to those on social media who are following the primary player's progress). In accordance with the present disclosure, one of the excitement enhancing actions automatically provided by the gaming system 1000 is that of occasionally and by chance enlarging and/or shifting the so-called boosted feature areas (e.g., 136 of FIG. 1B—described below) into which special-feature symbols (e.g., WILD card 1012*c*) may by chance land and then get boosted as a result.

Still referring to FIG. 1A and in terms of yet further details for one embodiment, the base cabinet 1008 includes an internal access entry mechanism instantiated for example as door 1014. The door 1014 swings outward and is coupled to a back portion 1015. The door 1014 includes a locking mechanism 1016. During normal operation, the door 1014 is locked. Typically, unlocking the door 1016 causes the gaming machine 1002 to enter a tilt mode where gaming functions, such as the play of a wager-based game, are not available. This tilt mode can be referred to as a hard tilt.

The cabinet 1008 can include a number of apertures that allow access to portions of a number of devices which are mounted within the cabinet. These gaming devices can include, but are not limited to displays such as 1018 and 1026, speakers such as 1020*a* and 1020*b*, a printer 1022, a bill acceptor 1024, a magnetic and/or chipped card reader 1028 and a resting shelf and/or button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits into an account maintained for the primary player 1007 and/or the gaming machine 1002. The credits can be used for wagers. The printer 1022 can be used to print tickets to transfer credits from one gaming machine (e.g., 1002) to another or to monetize accumulated credits. Typically, the tickets can be redeemed for cash or additional game play, such as game play on another gaming machine or at a gaming table.

Figure 2:
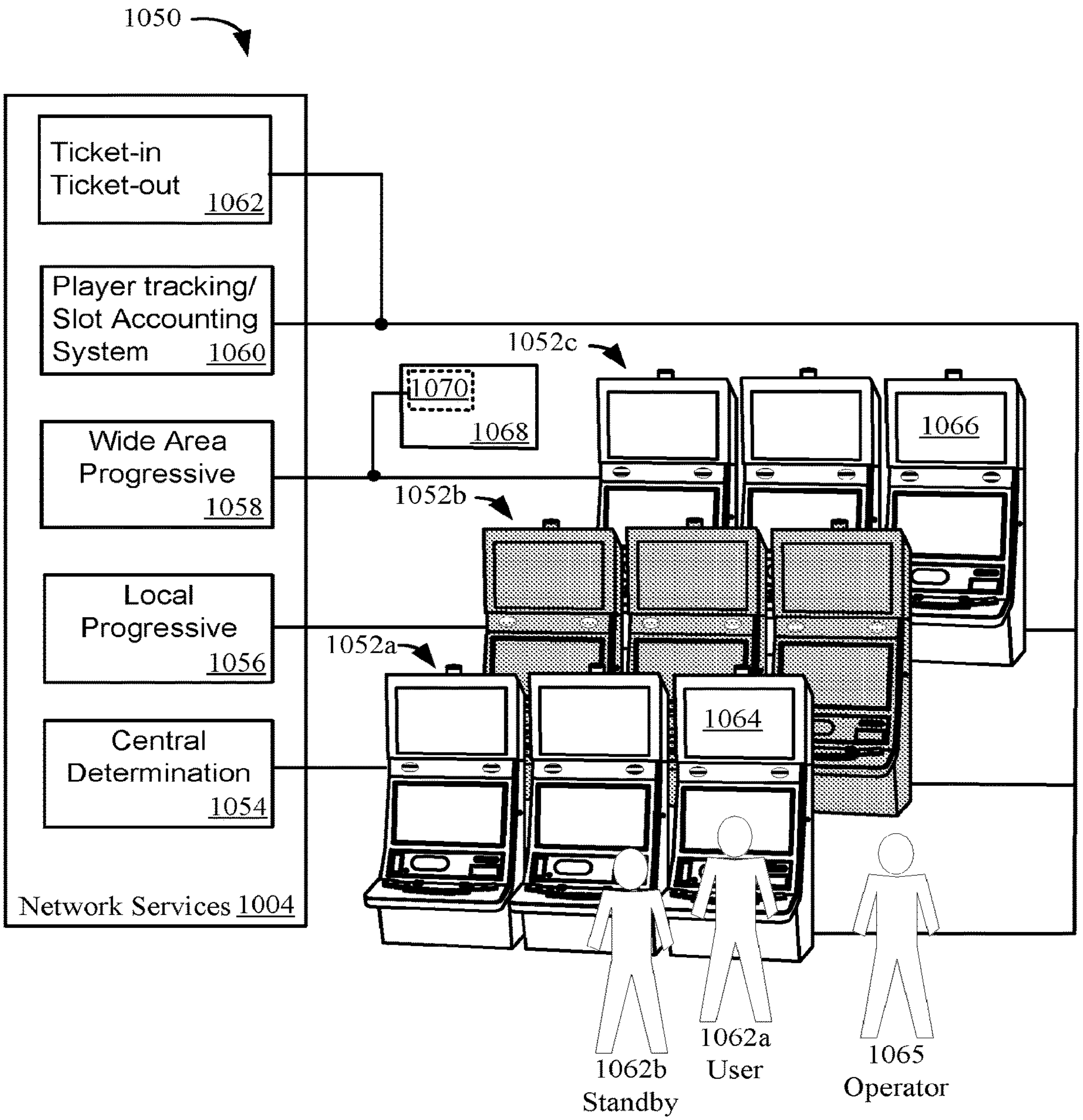
FIG. 2 illustrates a gaming system including three banks of gaming machines that may participate in a progressive jackpot pool.

The bill acceptor 1024 and printer 1022 printer can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary display 1018 or a secondary display such as the one 1026 illustrated to be smaller than and disposed below the primary game outcome display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, the gaming machine 1002 can enter a normal operational mode where game play is again available.

Figure 5:
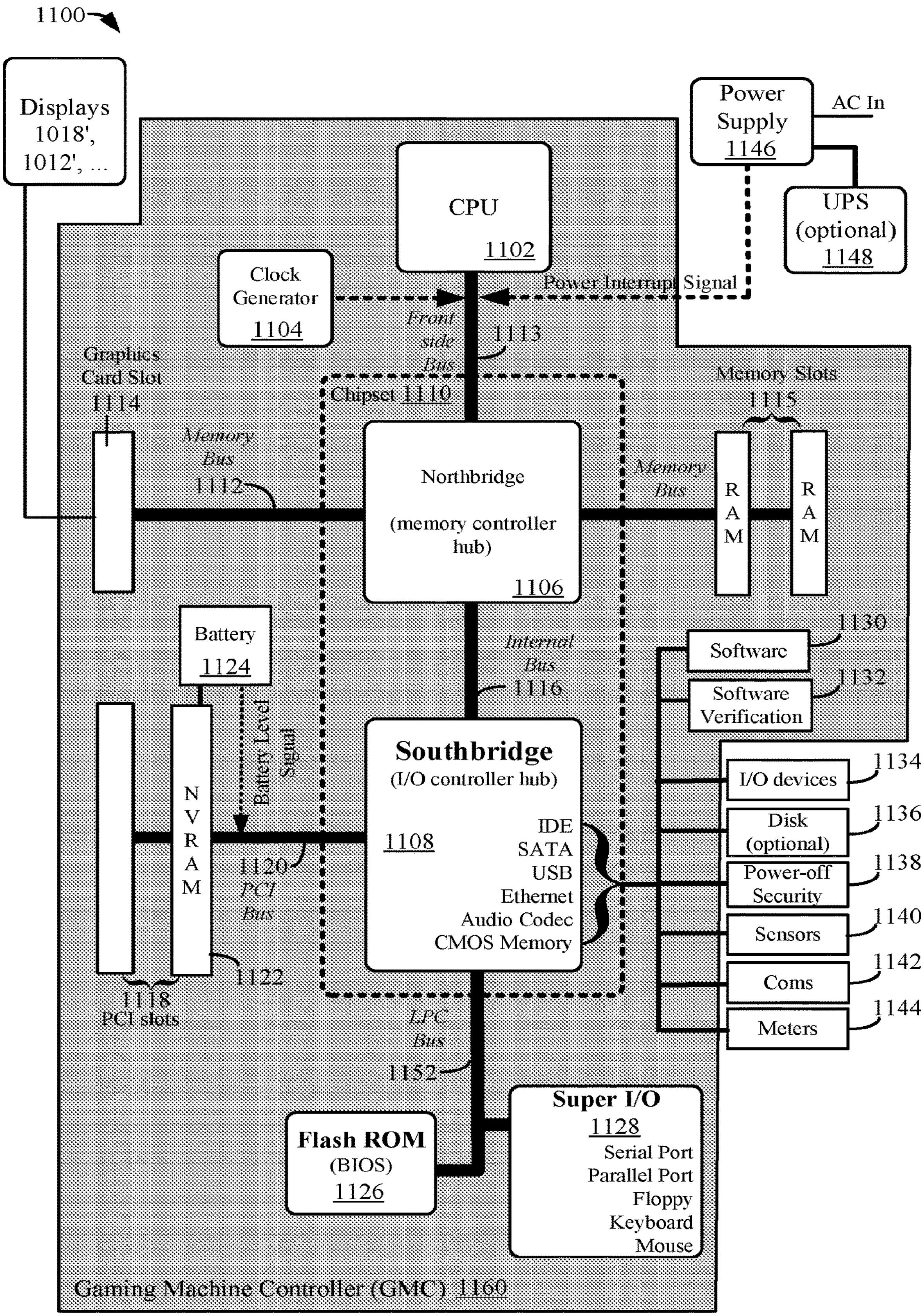
FIG. 5 illustrates a block diagram of gaming machine components including a gaming machine controller in accordance with the present disclosure.

In particular embodiments, the printer 1022 can be coupled to a gaming machine controller (see GMC 1160 in FIG. 5). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks) and enhanced gaming features (e.g., displaying game play information on the mobile device). The wireless connection 1036 cannot, however, be used to provide reconfiguration of EGM's and/or their associated controllers (e.g., the progressive pool controllers or PPAC's). The wireless interface can be provided as a standalone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. Via this access, devices mounted within the cabinet, such as displays 1018, 1026; speakers 1020*a*, 1020*b*; bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020*a*, 1020*b* and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007 is seated on it, but also when that player is jumping up and down or otherwise moving in the chair due to heightened emotions. This detected movement can be fed back to the services providing network 1004 for adaptively learning what gaming combinations tend to provide more excitement and/or entertainment. With authorization by the primary player 1007, a microphone and/or motion detector on his/her mobile device 1006 may be activated to provide similar automated feedback.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 5.

As another example, a number of security sensors can be placed within the interior of the cabinet 1008. The security sensors (e.g., see 1140 in FIG. 5) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected or stops functioning for other reasons.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

Speakers, such as 1020*a* and 1020*b* (only two shown, but there can be more and/or these can be elsewhere disposed), can be protected by a metal screen. In one embodiment, a speaker, such as 1020*a* or 1020*b*, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in display area 1042 (of FIG. 1A). The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 7.

As an example, a portion of a slot game outcome presentation is shown on display 1018. The slot game outcome presentation can include displaying of a symbols-revealing action window showing an array composed of a plurality of normal reel symbols. Such normal reel symbols can include symbols from conventional card games such as depicted in row 1039*a* and/or other symbols that are less frequently or less normally provided by the game and pointed to by reference 1038 (e.g., blazing sun symbol, bonus symbol etc.). The displayed reel symbols may also include less usual, less frequently provided special-feature symbols such as the star symbol that lands into row 1039*b* by a chance (e.g., due to exemplary toss 1012*t* thereto by the Lucky Kitty character 1012*a*). It is to be understood that arrow 1012*t* (representing the toss of the WILD symbol in one exemplary but nonlimiting game example) is schematic in nature and does not represent a physical object being thrown out of the machine to land elsewhere on the machine. Rather, animated actions on the one or more display monitors (e.g., 1012, 1018) can create the impression that a WILD card substitution (or other special-features insertion) initiates by chance in one part of the displayed game and then later completes in another part. During the game outcome presentation, original reel symbols and added-in special-feature can appear to move on the displays (e.g., by vertical movement to simulate a rotating reel) to create desired visual effects. For example, symbols (e.g., 1012*c*) can be made to appear to move off the upper display area 1018 and the same symbols (or slightly change derivatives thereof) can be made to newly appear onto the lower display area 1018.

Different combinations of symbols can appear on the primary display area 1018 for some period of time, which varies for each instance of the wager-based game that is played. At the end of an action-filled presentation, the symbols can be made to appear to settle and reach a final position or spin outcome. The final spin outcome may include an accounting for inserted special-features symbols such as WILD cards (e.g., landing into row 1039*b*) and an accounting for boosting actions applied to such special-features symbols if they land in a boosted features area. Then an award associated with the game outcome is presented on the display. The total award for the game can be indicated in display area 1044 for example and the total credits available on the gaming machine after the award can be indicated in display area 1040.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

More specifically in one embodiment, when a given spin takes place (e.g., indicated as such in one of display areas 1018, 1012 and 1026), a by-chance bonus awarding wheel 1012*b* is presented for actuation by the primary player 1007 (or by a casino dealer in case of a table game) and when actuated, it starts spinning. As the symbols of the spinning wheel 1012*b* in the primary display area 1018 start settling into a near-final outcome state, a relatively large horizontal announcement area 1012*h* may first indicate how close to a jackpot win is the state of the spinning wheel 1012*b*, and then when the wheel 1012*b* finally settles into its final outcome state, announcement area 1012*h* may indicate the win (e.g., "Jackpot!!!) or how close the spin came (e.g., "Missed by one rung!"—not shown). Announcement area 1012*h* may also be used to indicate the winning of low frequency hands (e.g., "Royal Flush Here!!"—not shown). In one embodiment, large announcement area 1012*h* is used to indicate when a more-frequent boosted features area (e.g., 136 of FIG. 1B) has been enlarged to be a less frequently offered large boosted features area (e.g., 146 of FIG. 1E) and/or when a special-feature symbol (e.g., WILD card 1012*c*) has landed into a boosted features area (e.g., 136 or 146) and has been boosted as a result.

FIG. 1B schematically depicts one embodiment 101 of a gaming system in accordance with the present disclosure. For sake of avoiding illustrative clutter, certain hardware aspects of the depiction are not shown but are nonetheless understood to be implicitly present. More specifically, some or all of the plural symbol-bearing virtual reels of exemplary columns C1 through C7 are understood to be displayable by a display monitor of a gaming machine similar to that described for FIG. 1A. The column designations C1 through C7 and row designations R1 through R6 are of course generally not displayed. Moreover, dash-dot boxes 135 and 155 which are used to designate various portions of the displayable array of reel-borne symbols are not displayed. On the other hand, frame 136 which designates a so-called boosted features area may be displayed as a pulsating ring and/or the area enclosed in frame 136 may be displayed as overlaid by a semitransparent cover or the equivalent so as to distinguish it from other areas in the displayable array of reel-borne symbols that are not in a boosted-features area. Spaces provided in FIG. 1B between the rows and columns for accommodating dash-dot boxes 135 and 155 as well as frame 136 are generally not displayed as such spaces. The rows and columns are generally adjacent one to the next.

Further hardware aspects of the schematic of FIG. 1B that are implied but not explicitly shown include one or more digital data processors and associated memories (including software loaded therein) that are used for implementing and/or controlling the display and various nonrandom and random chance mechanisms associated with determining which reel-borne symbols (e.g., J=Jack, Q=Queen, K=King) will be displayed as a result of each initiation of reel-spinning within the game and determining which, if any, special-feature symbols (e.g., WILD cards) will also be displayed.

In one embodiment, each of the vertically extending virtual reels corresponds to one or more fair or skewed decks of cards that are randomly pre-shuffled prior to commencement of spinning of the respective reel. (A fair deck is understood to correspond to 52 cards composed of four suits (i.e. hearts, diamonds, spades and clubs) each consisting of the numbers 2-10 plus of the J, Q. K and A cards. A skewed deck is understood to have replications that favor one type of cards over another type.) The card decks may have special feature cards such as Jokers interspersed within them. The commencement of a spin is initiated by a spin initiation signal 109. This initiation signal 109 can be responsive to a button push by a player or to an automated provision of a free spin. In response, random chance mechanisms Si through S7 are activated to respectively and independently spin their respective virtual wheels of columns C1 through C7 and bring them to a randomly selected stop position as displayed through an outcome showing window such as 3×5 window 135. This exemplary three-by-five window 135 is conventional for five card play hands such as used in poker. It is to be understood that the number of displayable columns (e.g., C1 through C7) and displayable rows (e.g., R1 through R7) can be fewer or greater. The numbers shown in FIG. 1B are merely illustrative. In the same or an alternate embodiment, outcome showing window may be a 5×5 one such as indicated by dash-dot box 155. In one embodiment, players may preselect one or more so-called paylines on whose spin outcome they are betting. Conventionally, one of the selectable paylines is a horizontal line across the middle row (e.g., R4) of the 3×5 window 135.

If the outcome of the random reel spins produces a high-scoring hand along one of the player-selected paylines (e.g., a poker Royal flush), the player wins something of value. Even if the outcome of just the reels spin itself does not produce a sufficiently high-scoring result, a so-called special-feature providing mechanism may occasionally by chance cause certain special-feature cards (or other appropriate symbols) to appear in the outcome revealing window (e.g., 135 or 155) so as to potentially increase the score above that produced by the normal symbols (e.g., 10, J, Q, K) appearing alone as a result of the random reel spins. More specifically, a WILD card 1012*c* may occasionally appear as or be overlaid on top of one of the reel-borne symbols in the outcome revealing window (e.g., 135 or 155) so as to allow for increased scoring of a corresponding hand.

In the illustrated embodiment 101, and automatic spin start detector 110 detects presence of the spin initiating signal 109. In response, the spin start detector 110 activates a random outcome-providing mechanism 111 (e.g., a random number generator or the like) which determines whether or not special-feature providing symbols (e.g., WILD cards, bonus spin cards, payout doubling cards, etc.) will be generated for the current spin, and if so what kinds and how many of each. In the illustrated example, the first outcome-providing mechanism 111 has a predetermined first probability of P1(Toss) of tossing in one WILD symbol 1012*c*, a predetermined lesser probability of P2(Toss)<P1 (Toss) of tossing in two WILD symbols and further predetermined lesser probabilities for tossing in yet greater numbers of WILD symbols for the given spin. Probabilities for tossing in other types of special-feature-providing symbols may be predetermined as being independently or co-dependently based on the number of tossed-in WILD symbols. Once again, it is to be understood that the illustrated "tossing" in of special-feature cards is merely for purposes of illustration. It is fully within the contemplation of the present disclosure that special-feature symbols appearing the outcome revealing window (e.g., 135 or 155) as a result of the spinning of the reels alone in. In other words, by-chance mechanisms Si through S7 (described above) can be the mechanisms that determine whether and where, as well as what kinds of special-feature symbols appear in the outcome-revealing window.

If the first outcome-providing mechanism 111 randomly determines that one or more special-feature-providing symbols will be tossed in to the outcome revealing window area (e.g., 135 or 155), a second outcome-providing mechanism 112 is activated to randomly determine the destination in the outcome-revealing window area for where each generated special-feature symbol (e.g., WILD symbols) will land. The randomness of this process is denoted by probability function P(Destination). In one embodiment, the trajectory 113 of each generated special-feature symbol is displayed as a slowly unraveling path so that the player can watch with anticipatory hope that the generated special-feature symbols will land in more desirable parts of the outcome revealing window area (e.g., 135 or 155). In one embodiment, the more desirable parts include the so-called boosted features area 136 for reasons that will become clearer shortly.

The illustrated embodiment 101 further includes a display controller 118 that controls what is displayed on the display and how. One of the aspects that the display controller controls is the size of the outcome revealing window area (e.g., 135 or 155). In accordance with one aspect of embodiment 101, the size of, and optionally location of the outcome revealing window area is relayed as informational signal 118*a* to the second outcome-providing mechanism 112 (P(Destination)) for thereby establishing the range of potential destinations that mechanism 112 can randomly toss the generated special-feature towards.

The illustrated embodiment 101 further includes a third outcome-providing random chance mechanism 116 that determines the size, shape and location, or respective sizes, shapes and locations of a respective one or more boosted-features area such as 136. In one embodiment, a probabilities distribution table (not shown) is generated ahead of time for determining the probability Pi(Feature Area) that the boosted-features area (e.g., 136) will be relatively small and positioned in a first spot within the outcome revealing window area (e.g., 135 or 155). The pre-generated probabilities distribution table further provides for a lesser second probability P2(Feature Area)<Pi(Feature Area) that the boosted-features area (see briefly 146 of FIGS. 1E-1F) will be larger in area. The table may provide for respective probabilities regarding where the relatively small or relatively larger boosted feature areas will be positioned in corresponding parts of the outcome revealing window area (e.g., 135 or 155) and whether they will appear as split areas (see briefly 146*a*, 146*b* of FIG. 1H) or unitary such boosting areas. The generated result of the third outcome-providing random chance mechanism 116 is schematically represented in FIG. 1B by arrow 116*a*. In actuality, the third outcome-providing random chance mechanism 116 generates an informational signal 116*b* that is related to the display controller 118 and the latter causes the corresponding one or more boosted feature areas (e.g., 136,146, 146*a*, 146*b*) to be displayed in accordance with that informational signal 116*b*. In one embodiment, the different shapes that can be generated by chance for the boosted-features area(s) include rectangles of varying heights and widths.

An automated detector 117 for automatically detecting a change in size, shape and/or location for the boosted features area(s) of the current spin relative to that of the previous spin is further provided. Detector 117 (also referred to herein as a Delta detector) stores information representing the size, shape and/or location of the previous spin and compares it to received information 117*a* (received from mechanism 116) representing the size, shape and/or location of the current spin. If a change is detected, and in one embodiment if that change is of a predetermined kind, the Delta detector 117 commands the display controller 118 by way of command signal 117*b* to display predetermined morphing effects 118*b* that make it distinctively apparent to players and bystanders that the features boosting area (e.g., 136) is changing in size, shape and/or location relative to the previous spin. The displayed morphing effects 118*b* can come in various forms including showing that the previous boosted-features area 136 has caught fire (e.g., by displaying attention-attracting flames around its border) and is growing in size and/or moving to a new location as part of a random outcome of the current spin. More generally, morphing shows the transition from the original size, shape and/or location of the boosted-features area of the previous gaming action to the new size, shape and/or location of the boosted-features area of the current gaming action that is developing in response to initiation of the spin for the current gaming action. Since the players and bystanders do not know for sure what will happen to the boosted-features area with each spin, this adds additional excitement to the results hoped for by participants for each spin. Other but nonlimiting ways in which the changes to the boosted-features area can be brought to the attention of players and bystanders is by advertising it in the big display region 1012*h* of FIG. 1A (e.g., scrolling a "Bigger Boost Here" message), by increasing the frequency of pulsation of the boundary of frame 136, by changing and/or pulsating the color(s) of the boundary and/or of the semitransparent overlay for that boosted features area, by increasing and/or pulsating the display brightness of the boundary and/or the semitransparent overlay, and so on. More generally, the drawing of the attention of players and bystanders to the changes between the boosted features area of an immediately prior spin and that of a current spin may include use of various animation effects, sound effects, haptic effects (e.g., vibrating a user touched surface on the slot machine) and so on.

Figure 1C:
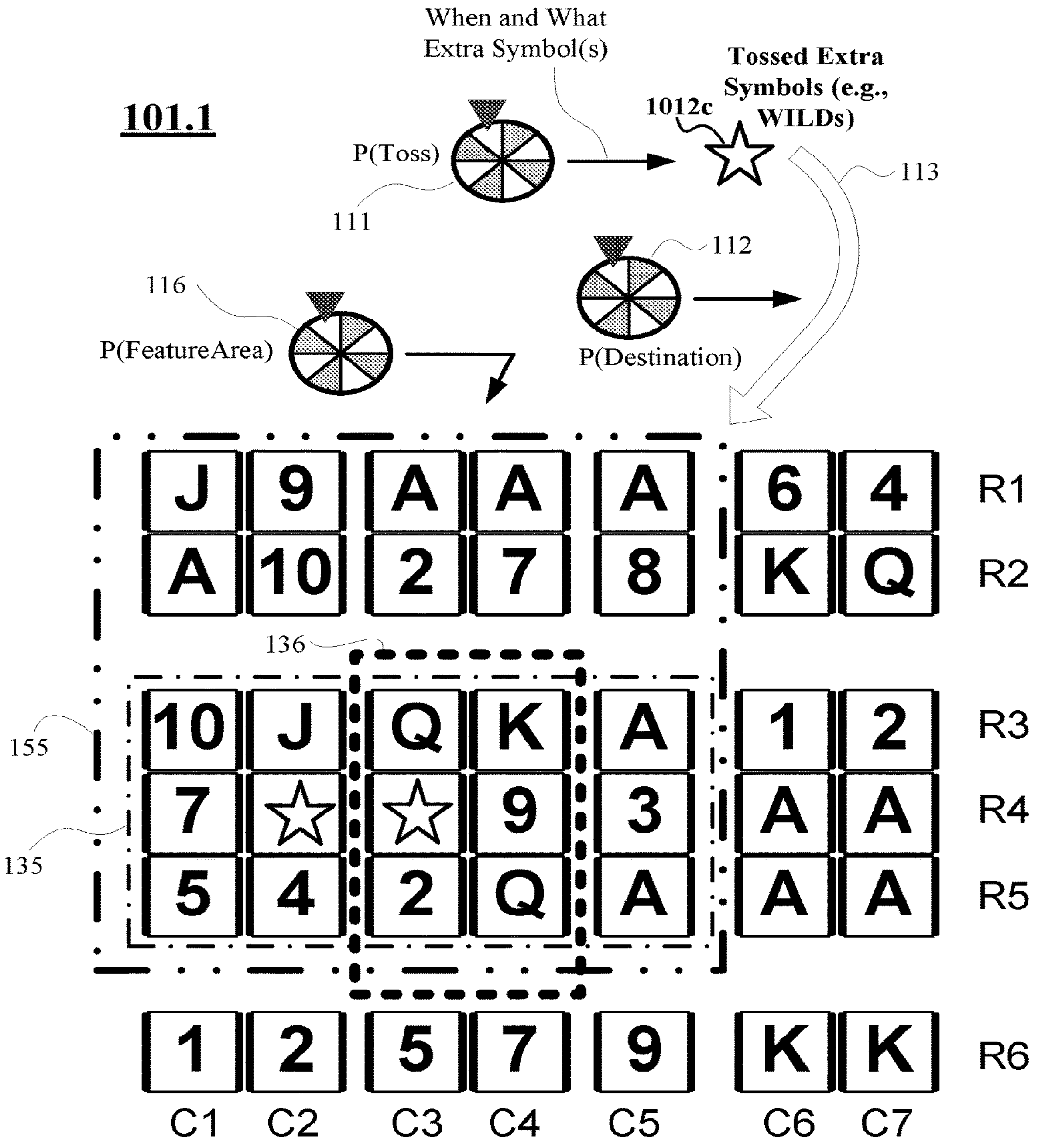
FIG. 1C depicts the system of FIG. 1B for a case where the special-features symbols are WILD cards and one lands inside the current boosted features area(s) while the other lands outside.

Referring to FIG. 1C, a first exemplary state 101.1 is shown for the embodiment 101 of FIG. 1B where first and second special-feature symbols (e.g., stars representing WILD cards) have respectively landed at columns C2 and C3 of row R4. The first special-feature symbol has landed outside of boosted-features area 136 while the second special-feature symbol has landed inside of area 136. As a result, the second special-feature symbol will receive boosting affects while the first special-feature symbol does not. This is next shown in FIG. 1D. Before moving on to that next figure, it is to be noted that FIGS. 1C-1H do not show all the details mechanisms depicted in FIG. 1B. This is done merely for purpose of avoiding illustrative clutter. The mechanisms are understood to be also present in FIGS. 1C-1H.

Figure 1D:
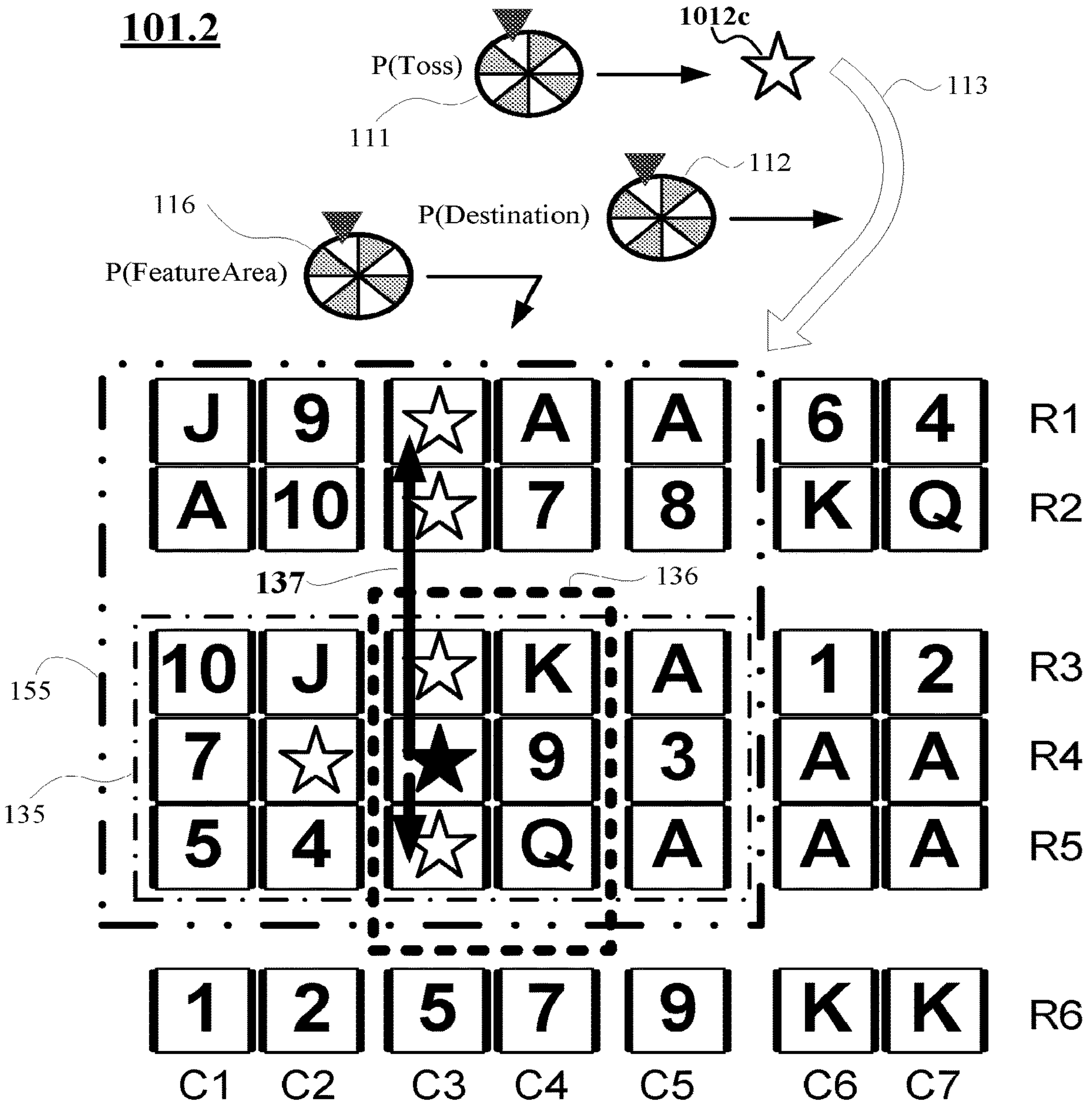
FIG. 1D depicts the system of FIG. 1C while showing a boosting action that replicates the WILD card that landed inside the current boosted features area(s) while the other WILD card is not so boosted.

Referring to FIG. 1D, a second exemplary state 101.2 is shown where a predetermined boosting effect has been applied to the second special-feature symbol (the one in location C3 R4) that landed inside of area 136 while no boosting effect has been applied to the first special-feature symbol (the one in location C2 R4). In this particular example, the boosting effect is that of vertically replicating the special-feature symbol (the one in location C3 R4) vertically to the vertical bounds of the current outcome-revealing window (e.g., 135 or 155). The original version of this boosted special-feature symbol (that which landed at location C3 R4) is schematically shown shaded in black while the replication-produced copies are shaded white. This is merely an example of a boosting effect that may be applied to special-feature symbols that land inside a boosted-effects area (e.g., 136). The boosting effect or effects that are provided by a boosted-features area may vary depending on the kind of special-feature symbol that landed inside the given boosted-effects area and/or depending on the current size of the outcome revealing window (e.g., 135 or 155). The current size of the outcome revealing window may vary for any of a number of reasons including the number of paylines that a player has chosen to wager upon prior to the start of a player initiated spin. Merely by way of example, an alternate boosting effect may replicate the in-area (e.g., in area 136) landing special-feature symbol horizontally to the horizontal boundaries of the current outcome-revealing window rather than vertically. Another example scatter duplicates a predetermined number of copies randomly within the current outcome revealing window (e.g., 135 or 155).

In one embodiment, one of the special-feature symbols that can appear in the current outcome-revealing window (e.g., 135 or 155) is a so-called, scatter-award symbol (not shown). For each group of three scatter-award symbols that appear by-chance inside the current outcome-revealing window, the player is awarded six free spins. Moreover, for each of these 'scatter-award' symbols that happen by-chance to appear inside the current 'boosted-features area' of the current spin, one pick from a set of 10 mystery prize items is awarded to the player. The picked mystery prize item may reveal and award different kinds of additional prizes including for example, chances to spin for jackpots, awards of enhanced prizes (including a jackpot) and/or extra free spins. So the 'boosted feature' of the scatter-award symbol in this exemplary embodiment is that it gives the player a chance for one of these mystery prize items (e.g., one of them awarding a jackpot) when the scatter-award symbol lands in the 'boosted-features area'. Thus player excitement grows when an enlarged boosted-features area appears by-chance.

Figure 1E:
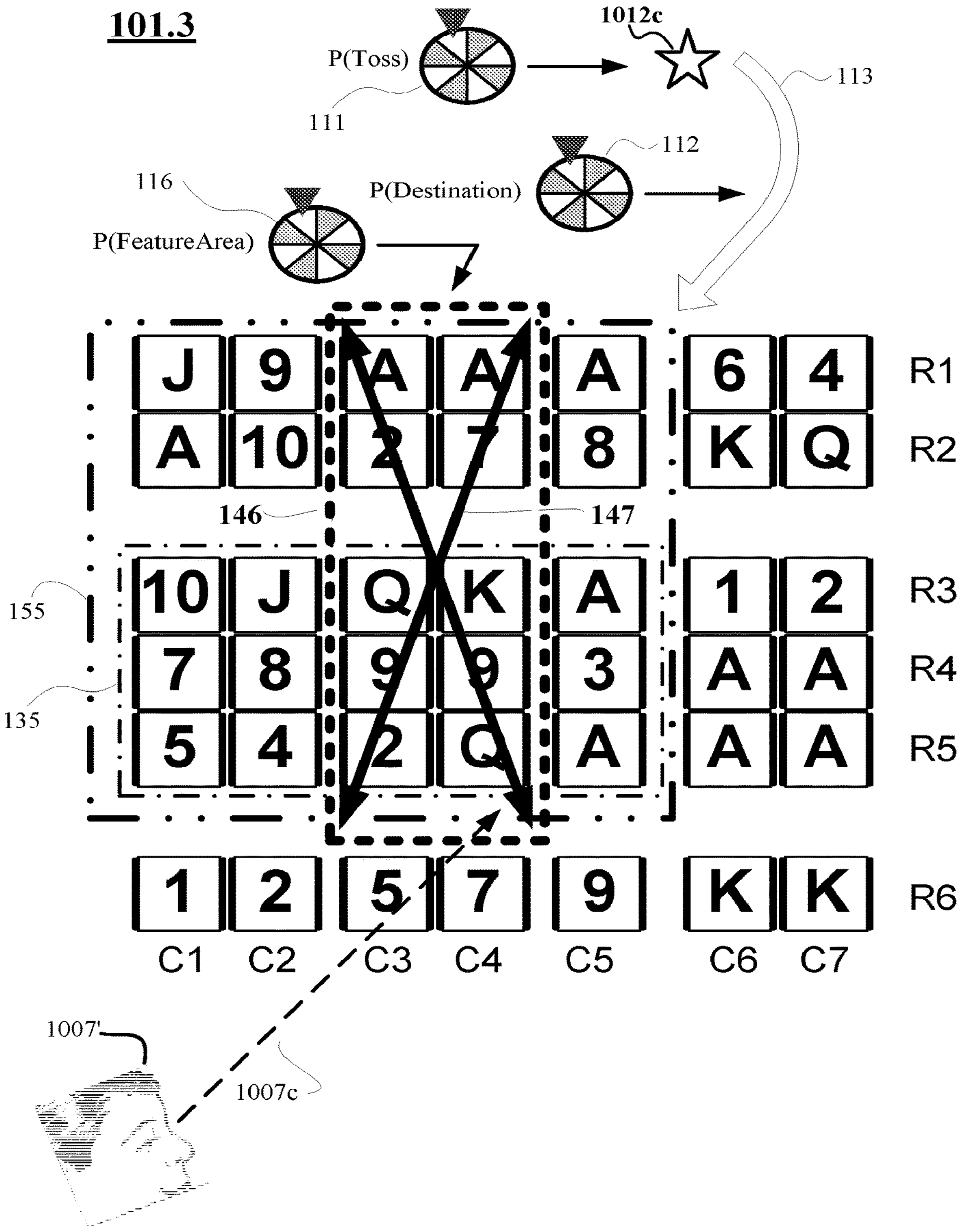
FIG. 1E depicts the system of FIG. 1B for a case where a larger boosted features area is generated by chance and morphing effects are displayed to alert players and bystanders to the change in size of the boosted features area.

Referring to FIG. 1E, a third exemplary state 101.4 corresponding to FIG. 1B is shown where the by-chance mechanism 116 has determined that a larger boosted features area 146 should be used for the current spin. In accordance with the present disclosure, the display controller (not shown—see FIG. 1B instead) responsively generates attention-drawing display effects (which may be accompanied by corresponding attention-drawing audio effects) to draw the attention (e.g., the gaze 1007*c*) of players and bystanders to the changing size (e.g., enlargement) of the boosted features area for the current spin. As mentioned, the attention-drawing display effects may come in various kinds including for example, showing the boundary of the boosted features area catching on fire and pulsating as it grows (represented schematically by growth arrows 147) from a size used in a previous spin to the larger size being provided for the current spin. When the primary player 1007' and/or other persons in the area see such attention-drawing display effects (and/or hear corresponding audio effects), their excitement can grow as a result of anticipating that a special feature symbol (e.g., WILD card) will land in the enlarged boosted features area 146 and as a result will provide benefits for the current spin.

Figure 1F:
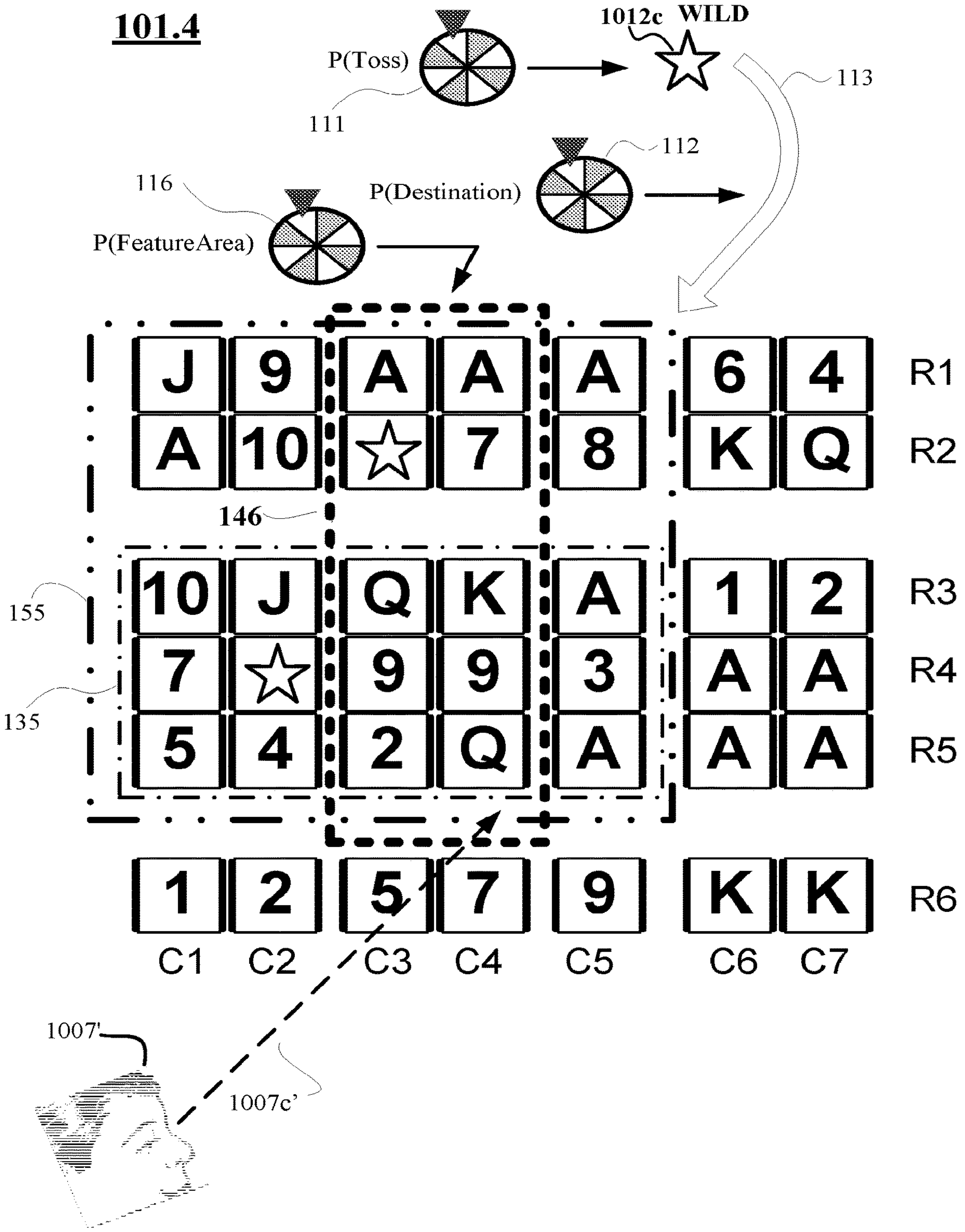
FIG. 1F depicts the system of FIG. 1E for a case where the special-feature symbols are WILD cards and one lands inside the currently enlarged boosted features area while the other lands outside.

Referring to FIG. 1F, a fourth exemplary state 101.4 is shown where first and second special-feature symbols (e.g., stars representing WILD cards) have respectively landed at column C2 row R4 and in column C3 row R2. The first special-feature symbol has landed outside of the by-chance enlarged boosted-features area 146 while the second special-feature symbol has landed inside of enlarged area 146. As a result, the second special-feature symbol will receive boosting affects while the first special-feature symbol does not. If the size of the current boosted-features area had been the smaller one 136 of FIG. 1B, the second special-feature symbol (of C3 R2) would not have received boosting.

Figure 1G:
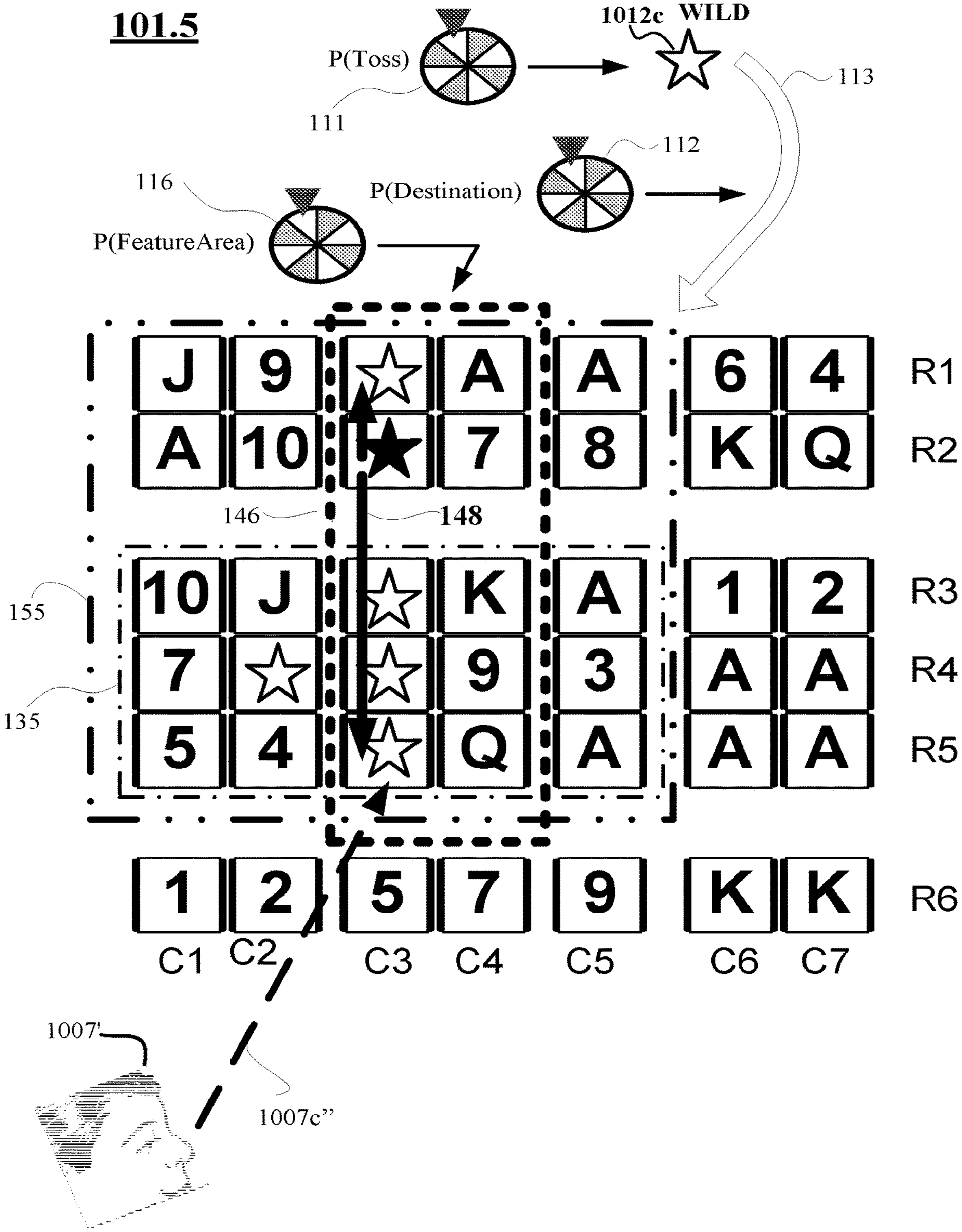
FIG. 1G depicts the system of FIG. 1F while showing a boosting action that replicates the WILD card that landed inside the currently enlarged boosted features area while the other WILD card is not so boosted.

Referring to FIG. 1G, a fifth exemplary state 101.5 is shown where a predetermined boosting effect has been applied to the second special-feature symbol (the one in location C3 R2) that landed inside of area 146 while no boosting effect has been applied to the first special-feature symbol (the one in location C2 R4). Once again, the original version of this boosted special-feature symbol (that which landed at location C3 R2) is schematically shown shaded in black while the replication-produced copies are shaded white. Also it is to be understood that this is merely an example of a boosting effect that may be applied to special-feature symbols that land inside a temporarily enlarged boosted-effects area (e.g., 146).

Figure 1H:
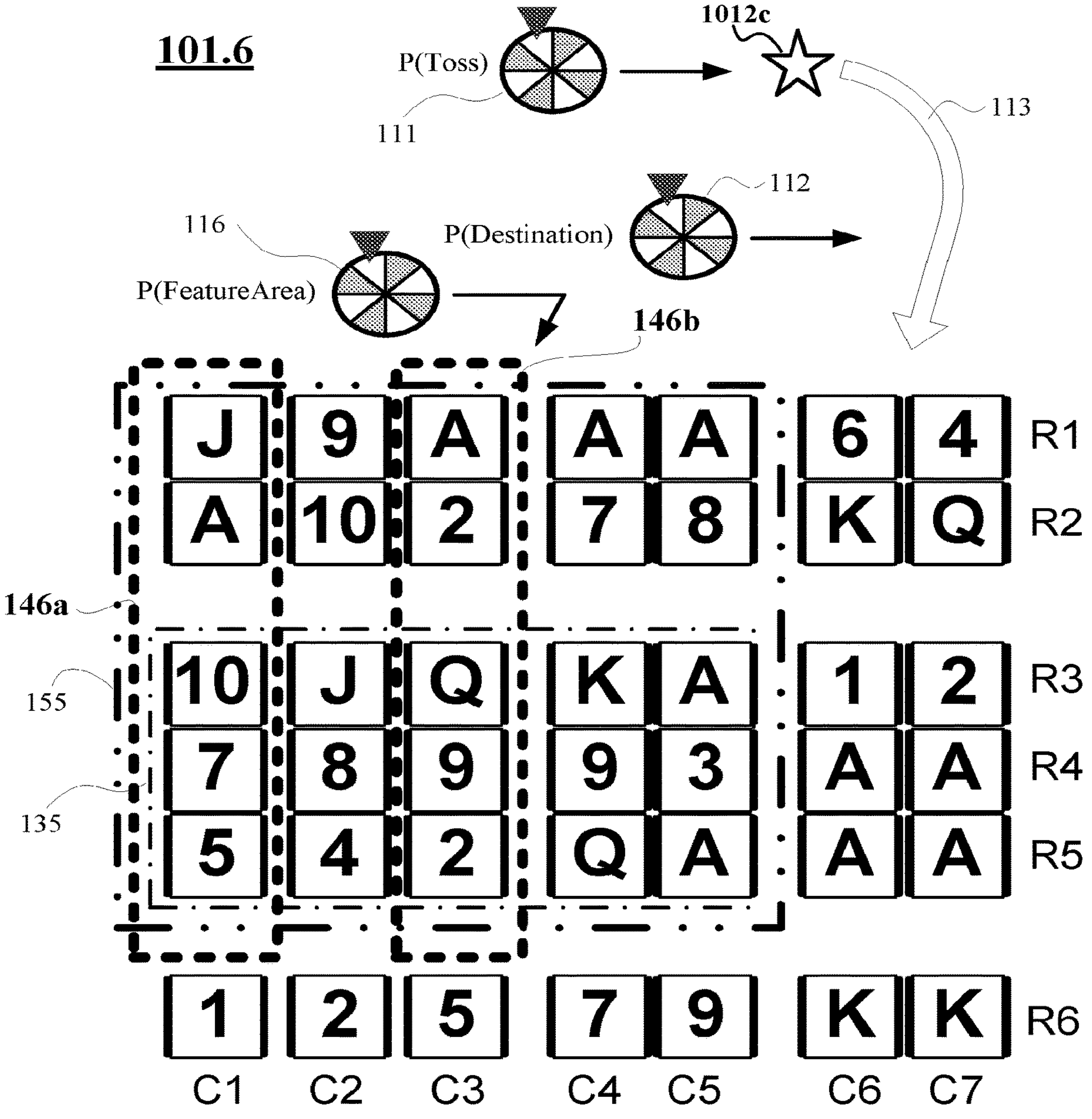
FIG. 1H depicts the system of FIG. 1B for a case where split boosted feature areas are generated by chance and implicitly morphing effects are displayed to alert players and bystanders to the change in the shape and/or size and/or location of the current boosted feature area(s).

Referring to FIG. 1H, a sixth exemplary state 101.6 is shown where the by-chance mechanism 116 has determined that a larger boosted features area having split portions 146*a*, 146*b* should be used for the current spin. In accordance with the present disclosure, the display controller (not shown—see FIG. 1B instead) responsively generates attention-drawing display effects (which may be accompanied by corresponding attention-drawing audio effects) to draw the attention (e.g., the gaze 1007*c*) of players and bystanders to the changing size (e.g., enlargement) and shape (e.g., split) of the boosted features area for the current spin. It is to be understood that other chance-based variations in size, shape and location of boosted-features areas are contemplated.

Next, referring to FIG. 2, further details of one embodiment of the network services providing portion 1004 and of gaming machine operations, including securitization features and possible points of weakness are described. In FIG. 2, gaming system 1050 includes three banks of gaming machines, 1052*a*, 1052*b* and 1052*c*. For purposes of illustration, three side-by-side gaming machines are shown in each bank although a different number could be used (e.g., 4, 5, 6 etc.) and different configurations (e.g., back-to-back rows).

The network services providing portion 1004 includes a central determination server 1054, a local progressive server 1056, a wide area progressive server 1058, a player tracking/slot accounting system server 1060 and ticket-in/ticket-out (TITO) server 1062. In gaming system 1050, all of the gaming machines in each bank, 1052*a*, 1052*b* and 1052*c*, are operatively coupled to the slot accounting system server 1060 and the TITO server 1062. However, only the gaming machines in bank 1052*a* are coupled to the central determination server 1054. Further, only gaming machines in bank 1052*b* and display 1068 are coupled to the local progressive server 1056. Finally, only the gaming machines in bank 1052*c* are coupled to the wide area progressive server 1058. The communication couplings between the gaming machines in each bank and the servers 1054, 1056, 1058, 1060 and 1062 can be wired connections, wireless connections or various combinations/permutations thereof.

In various embodiments, the central determination server 1054 can be used to generate a controlling portion of the game played on the gaming machines in bank 1052*a*. For example, the central determination server 1054 can be used to generate random numbers (e.g., by a pull tab method or otherwise) used to determine outcomes to the games played in bank 1052*a*. In another example, the central determination server 1054 can be used to generate all or a portion of the graphics used during play of the games on the gaming machines in bank 1052*a*. For instance, the central determination server 1054 can be configured to stream a graphical presentation of a game to a gaming machine, such as that of upper display graphics 1064 and/or of the gaming machine's lower displays. (Lower displays not numbered here because primary player 1062*a* is illustrated obstructing those further displays.) The streamed upper display graphics 1064 may include that which on occasion (e.g., randomly or pseudo-randomly) reveals an active special bonus situation (e.g., Possible Jackpot win Here; Enlarged Boosted Area Here, etc.), reveals the awarding of a substantial prize (e.g., Jackpot!!!) or the by-chance generation of an enlarged boosted-features area (e.g., 146). The streamed graphical presentations can be output to respective displays on respective ones of the gaming machines and also to additional larger displays mounted on walls or other fixtures near the respective bank of machines.)

In one embodiment, the central determination server 1054 can be used to generate numbers used in a bingo type games played on the gaming machine in bank 1052*a*. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 1054 can be configured to repeat the number draws for the bingo games at regular intervals. For example, number draws can be repeated every 20 milliseconds. Players at the various gaming machines coupled to the central determination server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 1054.

The local progressive server 1056 can be used to generate one or more progressive prizes that are limited to a local group of gaming machines, such as only the gaming machines in bank 1052*b*. When games are played on the gaming machine in bank 1052*b*, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1066. The wide area progressive server 1058 can be used to enable a progressive game played on gaming machines distributed over a wide area, such as multiple casinos distributed within a state. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount.

In general, displays with digital sign controllers can be provided through out a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, A, WILD, Q) and follow up bonus award opportunities (e.g., boosted-special features). The server1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062*a* (User 1062*a* can be playing games at one of the gaming machines in bank 1052*a*.). The player tracking account information can include a player's name, address, phone number, gender, etc. It is to be understood that the graphics presentations on any given gaming machine can be structured for entertainment and heightened emotions and/or expectations of not only the primary player 1062*a* but also for that of nearby other persons 1062*b*.

In one embodiment, a player, such as user 1062*a*, can insert a player tracking card in a card reader (e.g., see card reader 1022 in FIG. 1A). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1,A the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062*a*.

As an example, when a printer, such as 1022, is employed in a "cash out," the gaming machine controller (e.g., see GMC 1160 in FIG. 5) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1A). Then, the printer can print a ticket with the unique number, such as a unique number encoded in a bar-code, and a value of the ticket, such as five dollars.

When the ticket is later presented for redemption, the unique number can be used to validate the ticket. For example, the user 1062*a* can "cash out" at a first gaming machine, such as 1064 in bank 1052*a*, and receive a printed ticket with a unique number generated by the TITO server 1062. Then, the user 1062*a* can go to a gaming second gaming machine, such as 1066 in bank 1052*c*, and insert the ticket into a bill acceptor (e.g., see 1024 in FIG. 1A). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052*a*. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as those of displays 1064 or 1066, are operational, a user such as 1062*a* can engage in game play. Under some conditions, such as tilt conditions, game play can be suspended and an intervention by a casino-authorized operator, such as 1065, may be required. An operator intervention may require an operator, such as 1065, to be directly present at a gaming machine, such as that of display 1064. For example, the presence of an operator may be required to access an interior of the gaming machine to clear a tilt condition. In other examples, an operator may be able to clear a tilt condition from a remote location via a near field or other communication coupling with the gaming machine (e.g., using a mobile device such as 1006). One reason for requiring physical presence of casino-authorized operators (e.g., 1065) whenever the interior of a gaming machine (or of another gaming controller) is accessed is so as to provide an audit trail of who accessed what machine when and for what allegedly purposes. Typically there will be overhead video cameras watching the casino floor and recording all activities including that of various personnel accessing the interiors of respective gaming machines and/or gaming controllers. Direct remote reconfiguration of gaming machines and/or gaming controllers is not permitted at least in certain circumstances.

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1A, 2, an operator, such as 1065, may be required to be physically present at a gaming machine, such as 1064 and 1066, to clear a tilt condition. For example, to clear a tilt condition, the operator, such as 1065, may have to access an interior of a gaming machine to clear a paper jam in a printer or a bill acceptor (e.g., see printer 1022 and bill acceptor 1024 in FIG. 1A). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1065 may access a menu output on a main display of the gaming machine, such as 1064 or 1066, to perform a RAM clear. RAM clears are described in more detail below with respect to FIG. 5.

Figure 3:
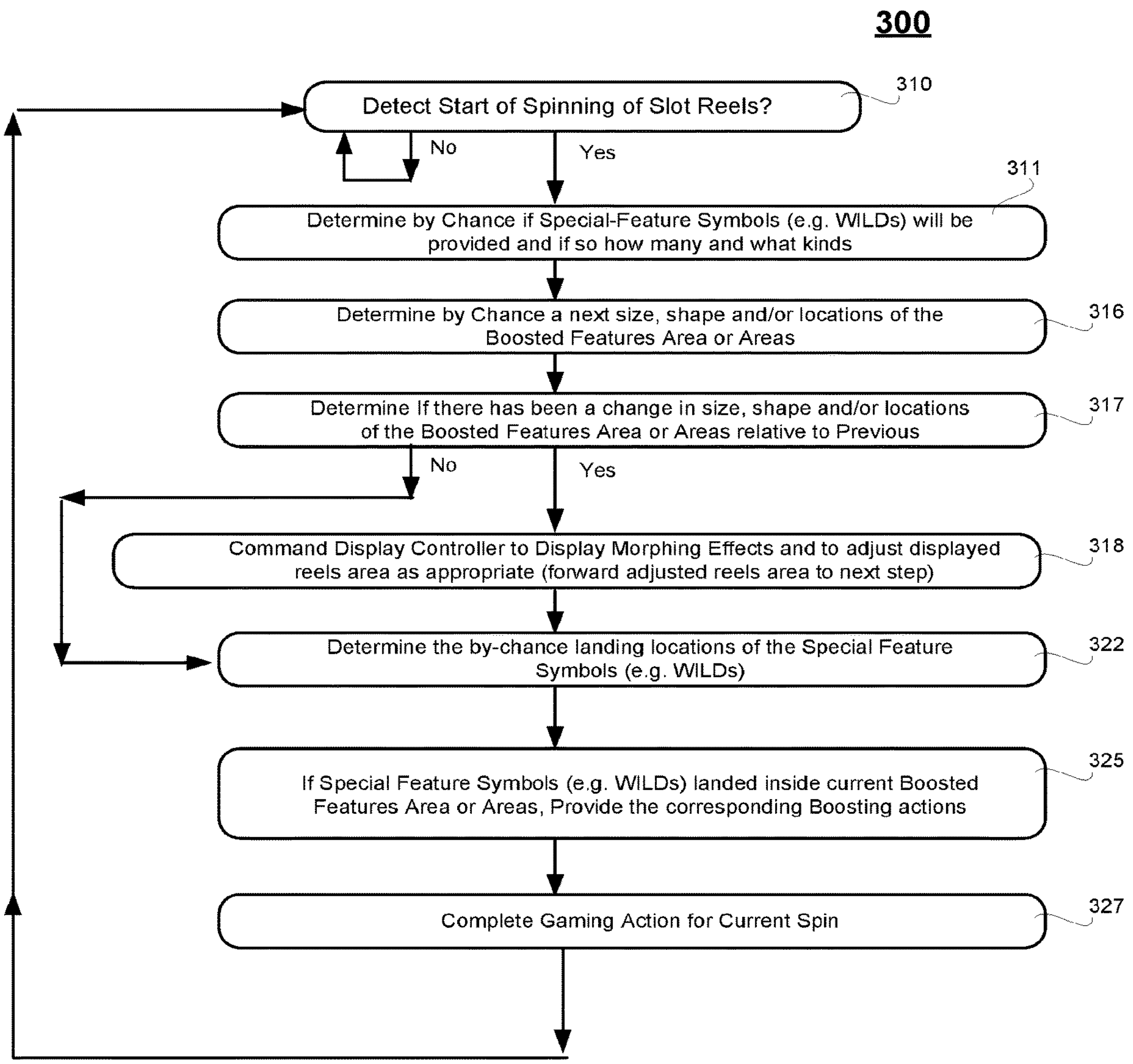
FIG. 3 is a flow chart depicting a machine implemented method for generating various boosted feature areas in accordance with the present disclosure.

Referring to FIG. 3, shown is a machine-implemented process 300 that includes by-chance variation of size, shape and/or location of boosted-features areas. More specifically, the process 300 may start at step 310 where a first automated test is carried out for detecting the start of spinning of the slot reels (e.g., by testing for a logic high level of the spin initiate signal 109 of FIG. 1B). If not detected control returns to test step 310. On the other hand, if a spin initiation is detected (Yes) control passes to step 311. As mentioned above, the by-chance landing of special feature symbols in the outcome-revealing window (e.g., 135 or 155) can come about in a variety of ways. In one embodiment, a separate by-chance determination is carried out for establishing whether special effect symbols (e.g., WILDs) will be generated, and if so what kinds and how many of each kind. In other embodiments, the special effect symbols are distributed in accordance with a predetermined probability distribution table along the reel strips of the respective, randomly spun reels.

In step 316, a by-chance mechanism (e.g., 116 of FIG. 1B) is used to determine a next size, shape and/or location or locations of one or more boosted features areas. The by-chance mechanism (e.g., 116 of FIG. 1B) can include a random number or other random symbol generator and may operate in accordance with a pull tab method (e.g., in which in a definitive number of occurrences of each symbol is specified for predetermined larger number of outcome pulls). The by-chance mechanism (e.g., 116) which controls generation of the one or more boosted feature areas for the current spin (the one detected in step 310) can operate in accordance with a predetermined probability distribution table which tends to produce smaller boosted-features areas (e.g., 136) more frequently and larger boosted feature areas less frequently.

In step 317, a test is carried out to determine if there has been a change in one or more of the size, shape and/or location or locations of the one or more boosted feature areas as compared to the previous spin. If No, control advances to step 322. If Yes, control advances to step 318.

In step 318, a command is sent to the display controller (e.g., 118 of FIG. 1B) to display morphing effects and/or other attention-drawing affects. The attention-drawing effects may include those showing the boosted-features area displayed for the previous spin as growing and shrinking in size while trending towards a bigger size and finally settling on the size determined by step 316. The attention-drawing effects may include showing the boundary of the boosted features area catching on fire, pulsating in terms of displayed colors and/or brightness, rotating at a greater or lower speeds and so on. The generated attention-drawing effects may be accompanied by corresponding attention-drawing audio effects. In some cases, the enlargement of the boosted features area may call for a corresponding enlargement of the outcome-revealing window on the display of the gaming machine (e.g., switching from window 135 two window 155). If that is the case, step 318 includes the forwarding of such information to subsequent step 322 and the outcome-revealing window is accordingly enlarged.

Step 322 includes determination of by-chance landing locations for the special feature symbols (e.g., WILDs), if any. Once again, while the illustrated example shows the by-chance tossing of such special feature symbols to destination locations in the outcome-revealing window, in other embodiments, the initial special feature symbols (before feature boosting) appear in the current outcome revealing window due to the by-chance spinning of the respective reels.

In step 325, and responsive to the determination made in step 322, it is determined whether any of the boosted feature symbols landed inside the current boosted features area. If yes, the corresponding boosting actions (e.g., vertical and/or horizontal replication) are provided.

Subsequent step 327 represents completion of the gaming action for the current spin based on the results generated at least in step 325. The completion of the gaming action may include determining whether any winning hands were generated along any of the player-selected paylines (not shown) and providing corresponding awards. Control may then return to step 310 from which the process repeats again for the next spin of the reels. Although the present example uses horizontally side-by-side vertical reels for generating a gaming action outcome within an outcome-revealing display window, it is within the contemplation of the present disclosure to use vertically side-by-side horizontal reels instead. It is within the contemplation of the present disclosure to display virtual wheels of chance in place of and/or in addition to the by-chance spun reels. Such a virtual wheels of chance may have one or more special feature symbols provided for their respective sectors and may be overlaid by special-feature boosting areas that frequently shift in location such that the special-feature boosting areas overlay one or more of the special feature symbols on the virtual wheel on a relatively rare basis. When the sizes of these on-wheel special feature boosting areas are enlarged on a by-chance basis, this increases the probability that boosting will occur.

Electronically-assisted games of chance, including those involving special feature symbols and boosted-features areas have been discussed herein. With respect to the chance providing mechanisms used in such games, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S. Pat. No. 9,830,130 (Random number generator); U.S. Pat. No. 9,792,089 (Random number generator using an incrementing function); U.S. Pat. No. 9,778,913 (Method of generating uniform and independent random numbers); U.S. Pat. No. 9,640,247 (Methods and apparatuses for generating random numbers based on bit cell settling time); USPTO PreGrant 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table.

Figure 4:
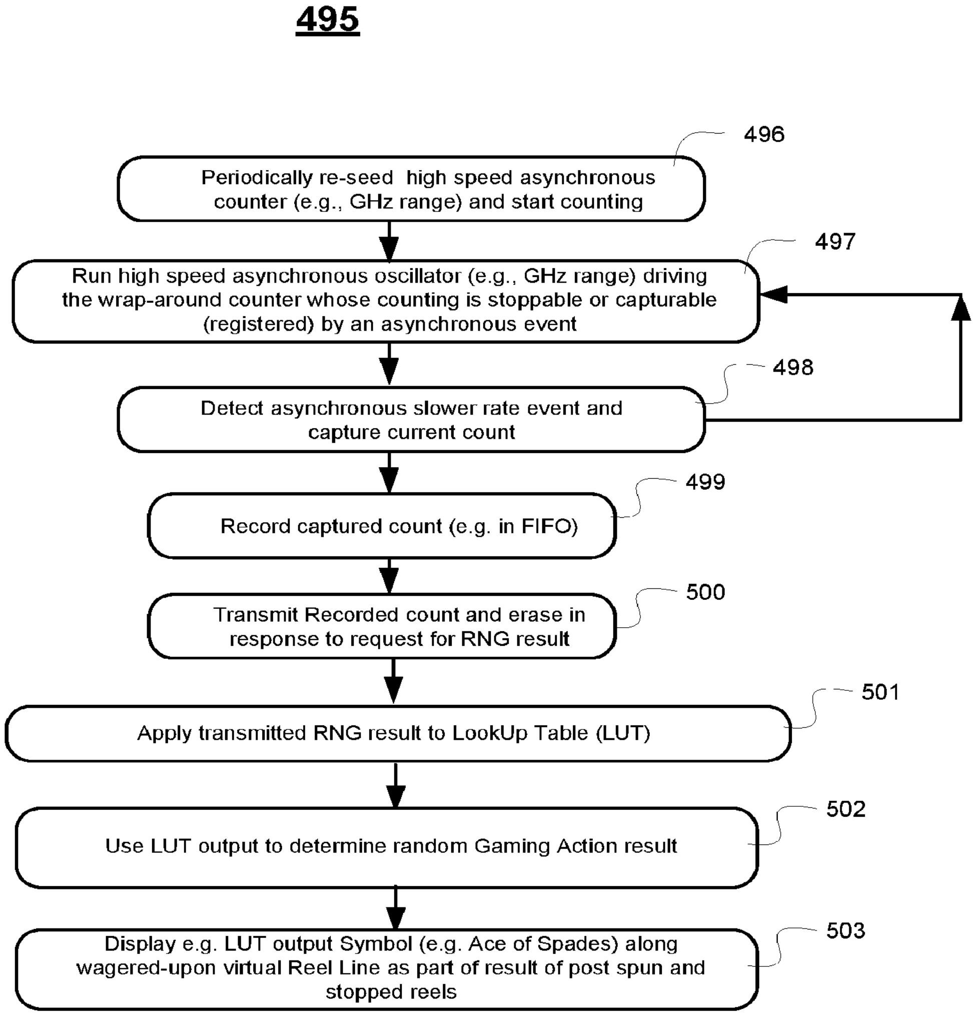
FIG. 4 illustrates a random number generation method.

Referring to FIG. 4, shown as a non-limiting example is a method 495 of using a random or pseudorandom number generator (RNG) for determining gaming action outcome. At step 496 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step 497, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step 498, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO). In one embodiment, the FIFO is a circular one of limited size whereby unused recorded counts are overwritten by newly captured random count values. At step 500 a request is received for an orangey result and in response the count value at the output end of the FIFO is transmitted to the requester. The transmitted count value is erased from the FIFO.

In step 501 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step 502, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step 503, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure (e.g., 1004) where the graphics for the gaming action are also generated and the graphics are transmitted by secure communication links to the local gaming machines in the respective banks.

Referring next to FIG. 5, details of a gaming machine controller that may be used to control the play of wager-based games (e.g., progressive pool games) including generating the game presentations and controlling the various gaming devices is described. FIG. 5 illustrates a block diagram of gaming machine components including a securely housed gaming machine controller (GMC) 1160. The GMC 1160 can be coupled to an external power supply 1146, displays such as 1018' 1012; etc., I/O devices 1134, external non-transient memories, such as a disk drive 1136, a power-off security device 1138, security sensors 1140, communication interfaces 1142 and meters 1144. In one embodiment, the communication interfaces 1142 of the GMC include one or more wired USB receptacles into which a T-commands providing USB storage device may be removably plugged in.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1A. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth™ Wi-Fi, and NFC. A schematic indication of such a wireless communication interface 1046 is shown in FIG. 1A. The remote servers (e.g., each server including one or more data processing units such as CPUs and appropriate memory such as SRAM, DRAM, Flash etc.) can form and provide the network services of block 1004 as described above with respect to FIG. 1A. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIG. 1A). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, the above described hash matching technique.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1A. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard. In one embodiment, the control programs are hash protected at install time per the above-described techniques and then automatically repeatedly verified periodically or on other event driven bases.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random-access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe. Alternatively or additionally the above described, secure encrypted SQL database may be used for assuring that decryption keys and/or procedures are not tampered with prior to validating the installed code and/or data segments.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the paytable, assets, and player files. The resulting information can be compared against the decrypted results from the manifest file and/or from the secure encrypted database server 2050'. If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques including, but not limited to, the above-described hash matching technique.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in the secure encrypted database server 2050'.

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 9.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

Figure 6:
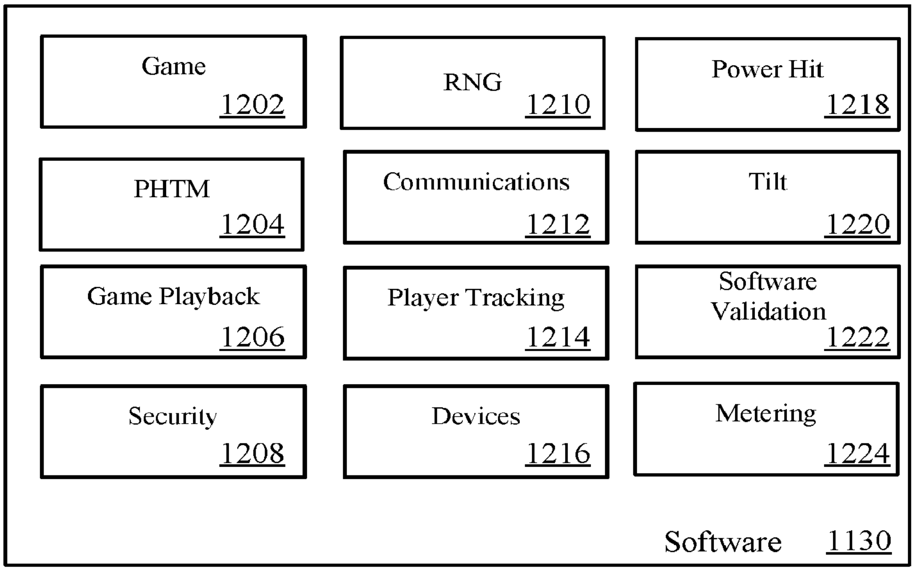
FIG. 6 illustrates a block diagram of gaming software in accordance with the present disclosure.

A gaming machine controller configured to generate a wager-based game in accordance with player selected volatility parameters is described with respect to FIG. 6. Gaming software used to generate the wager-based game is discussed with respect to FIG. 6. With respect to FIG. 7, a power hit tolerant memory configured to store crucial data generated from playing the wager-based game is discussed. The crucial data can include information associated with selected volatility parameters and wager-based games generated using the selected volatility parameters.

Figure 8:
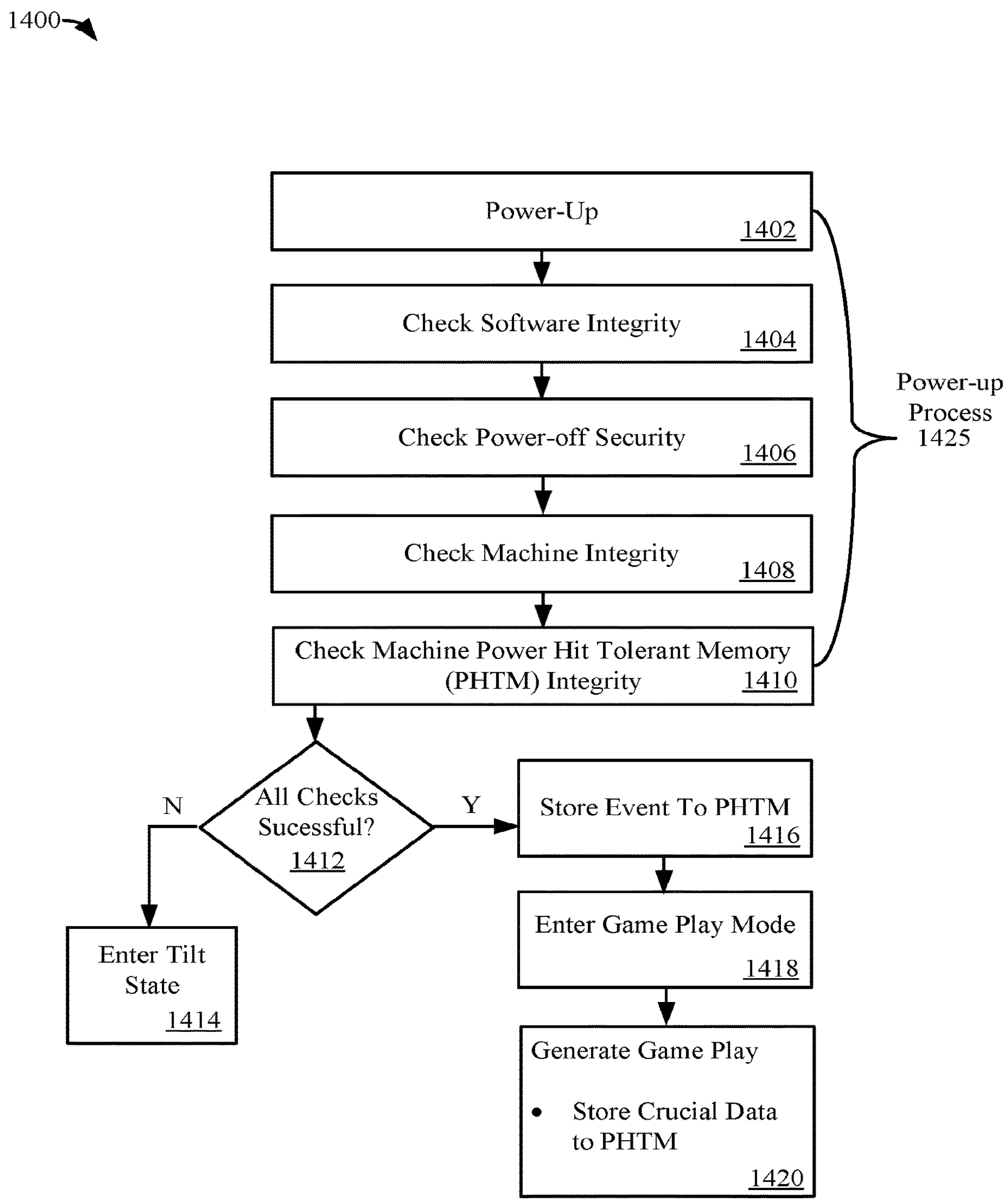
FIG. 8 illustrates a method for responding to a power interruption on a gaming machine in accordance with the present disclosure.

With respect to FIG. 8, a method for responding to a power interruption on a gaming machine, which utilizes the power hit tolerant memory, is discussed. With respect to FIG. 9, a method of powering up a gaming machine is described. Finally, with respect to FIG. 10, a method playing back a game, such as a wager-based game including a first primary game and a second primary game, previously played on a gaming machine is discussed.

FIG. 6 illustrates a block diagram of examples of gaming software 1130 that can be executed by a Gaming Machine Controller (GMC) 1160 in FIG. 5B. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 1208 can be configured to respond to information received from various security sensors disposed on the gaming machine and from the power-off security device (e.g., see 1138 in FIG. 4). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 5B) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range [0, 2Ak-1] for k-bit word length with a period of (21\19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1A) and in response add credits to the gaming machine. In another example, devices software may allow the GMC to communicate with a printer (e.g., see printer 1022 in FIG. 1A) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 4 or 1204 in FIG. 5) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1A). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 4), the memory storing the BIOS (e.g., see BIOS 1126 in FIG. 4) or the PHTM storing crucial data (e.g., see NVRAM 1122 in FIG. 4). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 4) and the GMC (e.g., see GMC 1160 in FIG. 4) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1A. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1A). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in the secure encrypted database server 2050'). This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 5). Examples of the meters which can be maintained are described above with respect to meters 1144 in FIG. 5.

Figure 7:
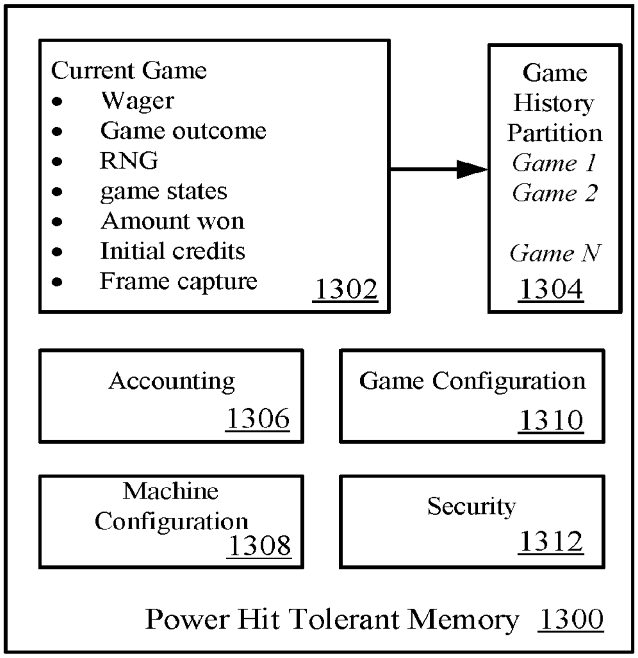
FIG. 7 illustrates a block diagram of power hit tolerant memory in accordance with the present disclosure.

FIG. 7 illustrates a block diagram of one embodiment of a power hit tolerant memory (PHTM) (Additional details of PHTMs are described with respect to NVRAM 1122 in FIG. 5 and PHTM 1204 in FIG. 6). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

FIG. 8 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 5), which may be a conventional ROM device. This conventional ROM device can load and can verify the initial code which continues the "verify then load"

ladder of trust until the entire operating system and the game is loaded. This process was described above in detail with respect to FIG. 5B.

In 1406, the power-off security device (see 1138 in FIG. 5 can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1A).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

Figure 9:
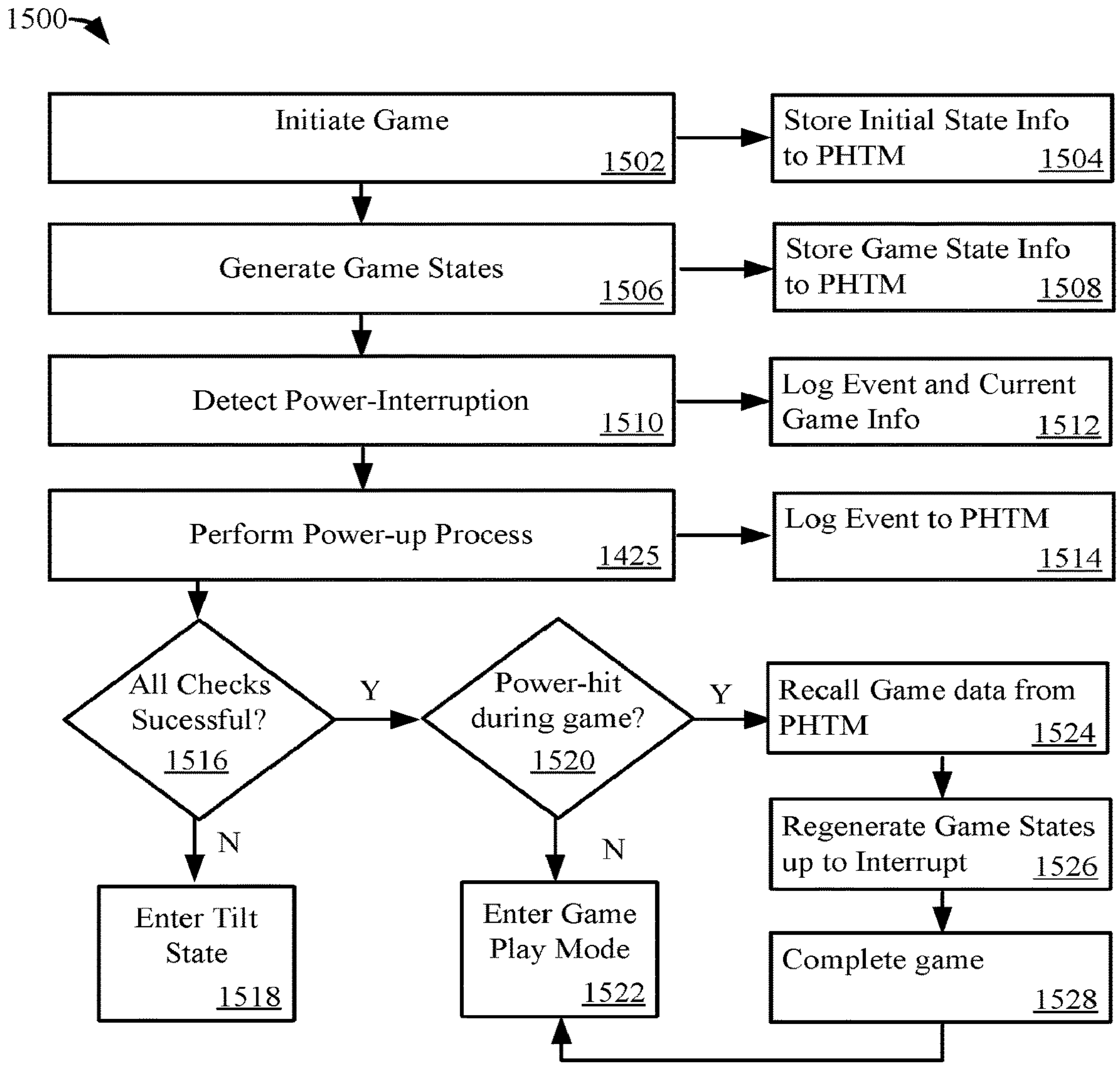
FIG. 9 illustrates a method powering up a gaming machine in accordance with the present disclosure.

FIG. 9 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 9 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 10:
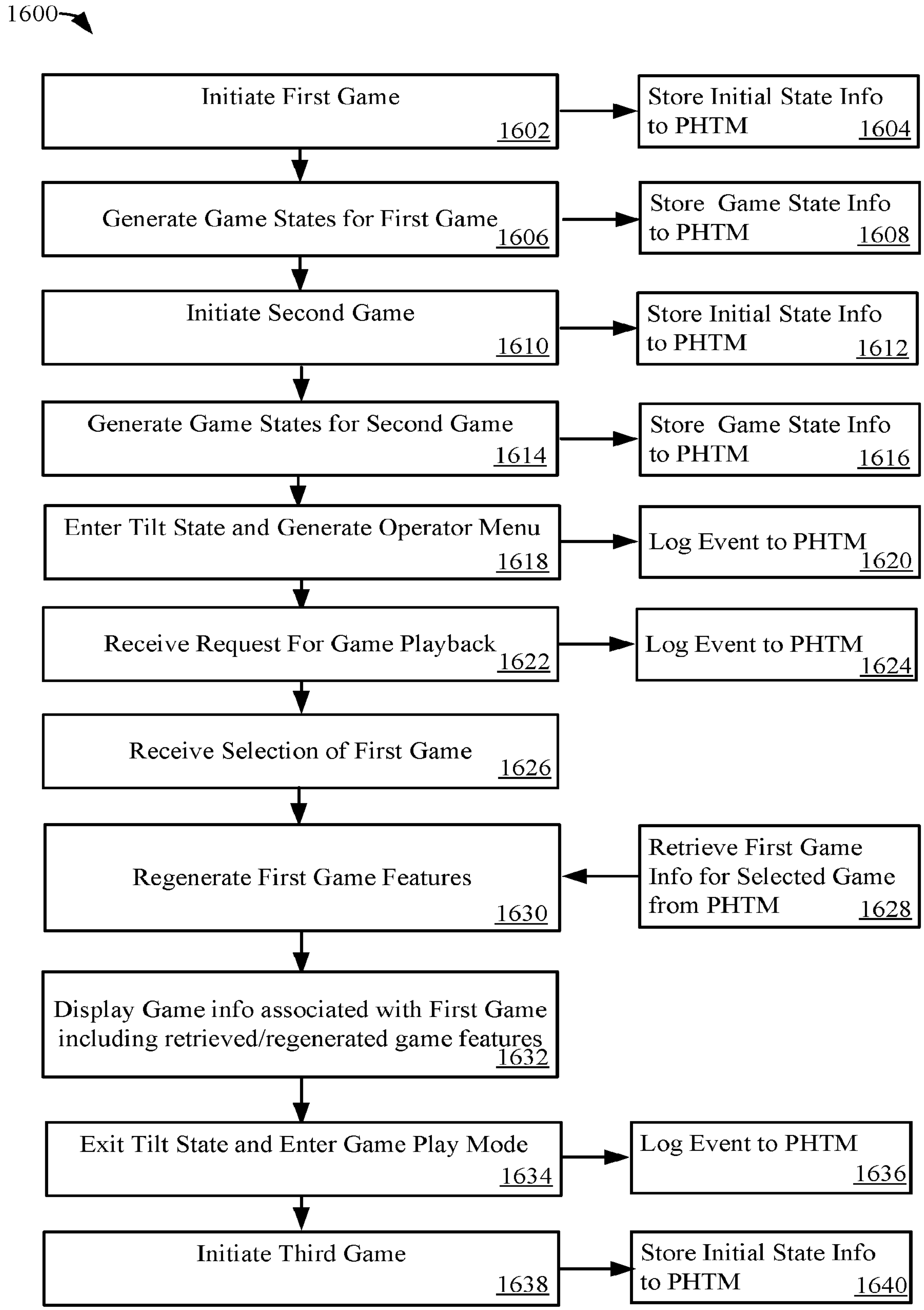
FIG. 10 illustrates a method playing back a game previously played on a gaming machine in accordance with the present disclosure.

FIG. 10 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 5B) can be configured to restore the game and the gaming machine to a game state just prior to the power hit using information retrieved from the PHTM (e.g., see NVRAM 1122 in FIG. 5B).

After the completion of the first game, in 1610, a second game can be initiated. The initial state information for the second game can be stored to the PHTM (e.g., see NVRAM 1122 in FIG. 5B). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1A). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

With respect to any material incorporated herein into by reference, it is to be understood that if there is conflict between the incorporated material and the present disclosure, the present disclosure controls. If there is conflict between two or more of the incorporated materials, the later dated one controls.

While the present disclosure has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A machine-implemented method carried out for a gaming machine, comprising:

accepting a wager from a player of the gaming machine;

initiating presentation of the game;

detecting initiation of a current gaming action associated with the presentation of the game at the gaming machine;

selecting, for the current gaming action, based in least in part on a distribution table, one of a plurality of different boosted features areas, wherein each of the plurality of different boosted features areas define boosted features areas which vary in at least one of a size, a shape and a location of at least two game symbol positions of a plurality of game symbol positions and two of the plurality of different boosted features areas are associated with different probabilities of being selected in the distribution table;

determining if a special-feature symbol lands inside the determined boosted features area of the current gaming action;

applying a corresponding boosting for the special-feature symbol that lands inside the determined boosted features area of the current gaming action; and determining an outcome of the game and awarding at least one award associated with a winning outcome of the game.

2. The method of claim 1, further comprising causing a video display of said gaming machine to graphically display a plurality of game symbol positions and graphically indicating, relative to said plurality of game symbol positions, said boosted features area wherein the special feature symbol is a WILD card symbol.

3. The method of claim 2, further comprising causing said video display of said gaming machine to display game symbols relative to said plurality of game symbol positions, wherein said game symbols may comprise one or more special-feature symbols, and wherein said step of selecting is performed before said step of determining if said special-feature symbol lands inside the determined boosted features area 1, further comprising randomly determining a number of the special feature symbols to be utilized in the game, if any, and a landing location of any determined special feature symbols.

4. The method of claim 2, wherein said plurality of game symbol positions are arranged in horizontal rows and vertical columns and said step of applying a corresponding boosting comprises replicating said special-features symbol in at least one of a horizontal and vertical direction.

5. The method of claim 1, wherein presentation of the game comprises rotating a plurality of physical or virtual symbol reels to cause game symbols to be displayed in said game symbol positions and wherein the boosted features area is displayed as overlying a portion of the one or more reels in an outcome-revealing window that shows an outcome relevant portion of the reels.

6. The method of claim 1, further comprising:

determining if the boosted features area of the current gaming action is different from a boosted features area used in a gaming action immediately prior to the current gaming action; and responsive to determining that boosted features area of the current gaming action is different, generating graphical display effects that draw attention to the difference.

7. The method of claim 6, wherein the generated display effects comprise causing a video display of said gaming machine to graphically display a morphing from the boosted features area used in the prior gaming action to the boosted features area used in the current gaming action.

8. The method of claim 6, wherein the generated display effects include changing displayed colors for at least the boosted features area used in the prior gaming action or the boosted features area used in the current gaming action.

9. The method of claim 6, wherein the generated display effects include changing displayed brightness for at least the boosted features area used in the prior gaming action or the boosted features area used in the current gaming action.

10. The method of claim 6, wherein the generated display effects include changing displayed animations of at least the boosted features area used in the prior gaming action or of the boosted features area used in the current gaming action.

11. The method of claim 2, wherein the plurality of boosted features areas comprise at least one boosted features area of a first size and at least one boosted features area of a second size which is larger than said first size, wherein a probability of the boosted features area having the second size being selected is lower than a probability of the boosted features area having the first size being selected.

12. The method of claim 1, wherein the at least one award associated with a winning outcome of the game is increased based upon the boosting of the special-feature symbol landing in the boosted features area.

13. A gaming machine system comprising:

first means for detecting initiation of a current gaming action on a gaming machine;

second means, for establishing by chance at least one member of the group consisting of a size, a shape and a location of a boosted features area to be used for an initiated current gaming action, said boosted features area comprising at least two game symbol positions of a plurality of game symbol positions;

third means for causing a video display to graphically display said plurality of game symbol positions;

fourth means for determining if the determined boosted features area of the current gaming action is different in size, shape or location from a boosted features area used by the gaming machine in a gaming action immediately prior to the current gaming action;

fifth means responsive to the fourth means, for causing said video display to display, relative to said plurality of game symbol positions, a graphical effect that draws visual attention to the difference in size, shape or location, when the fourth means determines that boosted features area of the current gaming action is different from that of the prior gaming action;

sixth means for determining if a special-feature symbol of the current gaming action is landing inside the established boosted features area of the current gaming action; and seventh means for applying a corresponding boosting for the special-feature symbol, if any, that is determined to be landing inside the by-chance established boosted features area of the current gaming action.

14. The system of claim 13, wherein further comprising an eighth means for graphically indicating, relative to said plurality of game symbol positions, said boosted features area.

15. The system of claim 13, wherein the first, second, third, fourth, fifth, sixth and seventh fourth means comprise modules of machine-readable code stored in a memory of a gaming machine and executable by a processor of the gaming machine.

16. The system of claim 13, wherein the gaming machine system comprises at least one video display and said boosted features area is graphically displayed on said at least one video display.

17. The system of claim 16, wherein said boosted features area is a sub-area displayed in relation to said displayed game symbol positions.

18. The system of claim 13, further comprising eighth means for randomly determining a number of the special-feature symbols and a landing location of any determined special-feature symbols.

19. The system of claim 13, wherein said graphical effect that draws visual attention to the difference in size, shape or location comprises displaying a change in a size of a frame element which defines said boosted features area.

* * * * *